United States Patent
Shima et al.

(10) Patent No.: US 10,029,221 B2
(45) Date of Patent: Jul. 24, 2018

(54) AGITATION BLADE, AGITATION APPARATUS, BEVERAGE PREPARATION APPARATUS, AND AGITATION PORTION

(71) Applicant: Sharp Kabushiki Kaisha, Osaka-shi, Osaka (JP)

(72) Inventors: Hidekazu Shima, Osaka (JP); Masaru Misumi, Osaka (JP); Takeshi Sawada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 122 days.

(21) Appl. No.: 14/909,202

(22) PCT Filed: Aug. 4, 2014

(86) PCT No.: PCT/JP2014/070447
§ 371 (c)(1),
(2) Date: Feb. 1, 2016

(87) PCT Pub. No.: WO2015/019988
PCT Pub. Date: Feb. 12, 2015

(65) Prior Publication Data
US 2016/0175789 A1    Jun. 23, 2016

(30) Foreign Application Priority Data

Aug. 5, 2013 (JP) .................................. 2013-162316
Jan. 31, 2014 (JP) .................................. 2014-016471

(51) Int. Cl.
*B01F 7/18* (2006.01)
*B01F 7/00* (2006.01)
(Continued)

(52) U.S. Cl.
CPC ............. *B01F 7/0025* (2013.01); *A47J 31/40* (2013.01); *A47J 31/42* (2013.01); *A47J 31/44* (2013.01);
(Continued)

(58) Field of Classification Search
CPC .. A47J 31/40; A47J 31/42; A47J 31/44; A47J 31/462; A47J 43/0465; A47J 43/0722;
(Continued)

(56) References Cited

U.S. PATENT DOCUMENTS 3,066,921 A * 12/1962 Thommel ........... B01F 3/04539
                                                            261/30
4,312,596 A *  1/1982 Maezawa ................ A47J 43/07
                                                            366/343
(Continued)

FOREIGN PATENT DOCUMENTS

CN          2057839 U      6/1990
CN        102186572 A      9/2011
(Continued)

OTHER PUBLICATIONS

Official Communication issued in International Patent Application No. PCT/JP2014/070447, dated Nov. 11, 2014.
(Continued)

*Primary Examiner* — Dana Ross
*Assistant Examiner* — Joe E Mills, Jr.
(74) *Attorney, Agent, or Firm* — Keating & Bennett, LLP

(57) ABSTRACT

An agitation blade for agitating a liquid includes a cylindrical core having a central axis of rotation and a plurality of blade portions provided on a side of a first surface of a rotation portion, and the plurality of blade portions are provided to surround the central axis of rotation and provided to be rotated with respect to a center of rotation of the central axis of rotation.

10 Claims, 37 Drawing Sheets

(51) Int. Cl.

| | | |
|---|---|---|
| *A47J 31/40* | (2006.01) | |
| *A47J 31/44* | (2006.01) | |
| *A47J 43/07* | (2006.01) | |
| *A47J 43/046* | (2006.01) | |
| *A47J 31/42* | (2006.01) | |
| *A47J 31/46* | (2006.01) | |
| *B01F 13/08* | (2006.01) | |
| *B01F 5/10* | (2006.01) | |

(52) U.S. Cl.
CPC ......... *A47J 31/462* (2013.01); *A47J 43/0465* (2013.01); *A47J 43/0722* (2013.01); *B01F 5/108* (2013.01); *B01F 7/00241* (2013.01); *B01F 7/00558* (2013.01); *B01F 7/00583* (2013.01); *B01F 7/18* (2013.01); *B01F 13/08* (2013.01); *B01F 13/0872* (2013.01)

(58) Field of Classification Search
CPC ...... B01F 13/08; B01F 13/0872; B01F 5/108; B01F 7/00241; B01F 7/0025; B01F 7/00558; B01F 7/00583; B01F 7/18
USPC ....... 366/268, 290, 292, 295, 299, 257, 247, 366/241, 242, 317, 324, 329.1, 328.4, 366/205, 286, 14, 91, 96, 130, 174.1; 99/268
See application file for complete search history.

(56) References Cited

U.S. PATENT DOCUMENTS

| | | | |
|---|---|---|---|
| 6,068,395 A | 5/2000 | Ondracek | |
| 6,085,637 A * | 7/2000 | Fukushima | A47J 31/40 99/279 |
| 6,339,985 B1* | 1/2002 | Whitney | A47J 31/061 99/286 |
| 9,357,872 B2* | 6/2016 | Cahen | A47J 31/4403 |
| 2005/0002274 A1 | 1/2005 | Terentiev | |
| 2005/0047268 A1* | 3/2005 | Chen | B01F 7/00583 366/129 |
| 2005/0242120 A1* | 11/2005 | Sato | G07F 13/10 222/146.6 |
| 2006/0083106 A1 | 4/2006 | Gringer et al. | |
| 2006/0131765 A1* | 6/2006 | Terentiev | B01F 3/04248 261/93 |
| 2007/0221068 A1 | 9/2007 | Boussemart et al. | |
| 2008/0241343 A1* | 10/2008 | Mitchell | A23L 2/385 426/634 |
| 2010/0199847 A1* | 8/2010 | Li | A47J 31/42 99/283 |
| 2011/0226131 A1* | 9/2011 | Morin | A47J 31/3614 99/288 |
| 2012/0281494 A1* | 11/2012 | Terentiev | B01F 7/162 366/273 |
| 2014/0165845 A1* | 6/2014 | Issar | A47J 31/401 99/283 |
| 2014/0305316 A1* | 10/2014 | Sevcik | A47J 31/401 99/323.2 |

FOREIGN PATENT DOCUMENTS

| | | |
|---|---|---|
| CN | 102892337 A | 1/2013 |
| JP | 54-154581 A | 12/1979 |
| JP | 60-189326 U | 12/1985 |
| JP | 09-075756 A | 3/1997 |
| JP | 10-24230 A | 1/1998 |
| JP | 11-318714 A | 11/1999 |
| JP | 2001-188962 A | 7/2001 |
| JP | 2001-275838 A | 10/2001 |
| JP | 2002-373373 A | 12/2002 |
| JP | 2003-334593 A | 11/2003 |
| JP | 2005-523140 A | 8/2005 |
| JP | 2006-346062 A | 12/2006 |
| JP | 2008-519621 A | 6/2008 |
| JP | 2009-146127 A | 7/2009 |
| JP | 3181538 U | 2/2013 |
| WO | 2011/152264 A1 | 12/2011 |

OTHER PUBLICATIONS

Official Communication issued in Japanese Patent Application No. 2017-077588, dated Jan. 30, 2018.

* cited by examiner

AGITATION BLADE, AGITATION APPARATUS, BEVERAGE PREPARATION APPARATUS, AND AGITATION PORTION

TECHNICAL FIELD

The present invention relates to an agitation blade, an agitation apparatus, a beverage preparation apparatus, and an agitation portion, for agitating and foaming a liquid.

BACKGROUND ART

Conventionally, various schemes have been invented for a beverage supply apparatus such as a tea dispenser and a coffee machine and used in various scenes. Not only there are apparatuses supplying drinks by agitating powders and hot water but also some apparatuses foaming milk are included.

For example, a tea dispenser including a powder tea supply apparatus includes a water boiling portion for boiling water and a grating portion for grating tea leaves in a main body including an operation panel, and stores powder tea ejected from the grating portion and supplies a certain amount into a container.

A beverage agitation apparatus is provided with agitation means in a mixing bowl. The mixing bowl is formed like a container for storing a drink therein. The agitation means is implemented as such a component that a disk-shaped agitation blade is provided around a rotation shaft and disposed in a central portion of the mixing bowl. In this beverage agitation tank, the agitation means is rotationally driven while a drink is stored in the mixing ball so that the drink is agitated by the agitation means.

Cappuccino and cafe latte represent coffee of which surface is covered with a layer of foamed milk. Steam has generally been made use of for foaming milk, however, a skillful operation has been required therefor.

PTDs 1 to 4 below disclose beverage preparation apparatuses as described above.

CITATION LIST

Patent Document

PTD 1: Japanese National Patent Publication No. 2008-519621
PTD 2: Japanese Patent Laying-Open No. 2002-373373
PTD 3: Japanese Patent Laying-Open No. 2001-275838
PTD 4: Japanese Patent Laying-Open No. 11-318714

SUMMARY OF INVENTION

Technical Problem

The technique disclosed in each PTD described above aims at agitation of powders and a liquid, and has not necessarily been optimal for fine particles of powders of green tea.

This invention was made to solve the problem above, and provides an agitation blade, an agitation apparatus, a beverage preparation apparatus, and an agitation portion capable of realizing, in agitation of a liquid, fine foaming simultaneously with agitation.

Solution to Problem

An agitation blade based on this invention is an agitation blade for agitating a liquid and includes a rotation portion having a central axis of rotation and a plurality of blade portions provided on a side of a first surface of the rotation portion, and the plurality of blade portions are provided to surround the central axis of rotation and provided in rotation symmetry with respect to a center of rotation of the central axis of rotation.

In another form, a plurality of paddle surfaces provided on a side of a second surface of the rotation portion are further included.

In another form, the blade portion has inclination spreading outward with respect to the rotation portion.

In another form, a tip end portion of the blade portion is provided with a slit extending from the tip end portion toward the first surface.

One aspect of an agitation apparatus based on this invention is directed to an agitation apparatus used for agitation of a liquid, the agitation apparatus includes the agitation blade described in any of the above, an agitation tank accommodating the agitation blade, and a drive mechanism for rotating the agitation blade, and a region directly under the agitation blade in an internal bottom surface of the agitation tank is recessed below a surrounding region.

In another form, a lowermost end of the agitation blade is located below the bottom surface other than the region directly under the agitation blade in the internal bottom surface of the agitation tank.

Another aspect of an agitation apparatus based on this invention is directed to an agitation apparatus used for agitation of a liquid, the agitation apparatus includes the agitation blade described in any of the above, an agitation tank accommodating the agitation blade, and a drive mechanism for rotating the agitation blade, a contactless rotation transmission mechanism transmitting rotational force of the drive mechanism to the agitation blade without contact is provided between the agitation blade and the drive mechanism, and a rotation support mechanism supporting a portion of contact of the agitation blade with the agitation tank by point contact during rotation of the agitation blade is provided between the agitation blade and the agitation tank.

In another form, the contactless rotation transmission mechanism rotates the agitation blade by generating magnetic coupling between the agitation blade and the drive mechanism and transmitting rotational force on a side of the drive mechanism to a magnet on a side of the blade.

Another aspect of an agitation apparatus based on this invention is directed to an agitation apparatus used for agitation of a liquid, the agitation apparatus includes the agitation blade described in any of the above, an agitation tank accommodating the agitation blade, and a drive mechanism for rotating the agitation blade, and the agitation tank is provided with a rectifying wall provided to surround the agitation blade, for rectifying, together with an inner wall of the agitation tank, a flow of the liquid formed as a result of rotation of the agitation blade.

In another form, a beverage preparation apparatus for preparing beverages with powders includes a milling machine for obtaining the powders by grating an object to be grated, a tank for storing a liquid, a heater portion heating the liquid in the tank and supplying the liquid, and an agitation apparatus supplied with the powders obtained by the milling machine and the liquid, for mixing the powders and the liquid, and the agitation apparatus described in any of the above is employed as the agitation apparatus.

In another form, the agitation apparatus cools the liquid heated and supplied by the heater portion through rotation of an agitation blade stored inside.

In another form, the agitation apparatus has a cooling apparatus and cools the liquid heated and supplied by the heater portion.

In another form of the agitation blade, $$0.2d(\text{mm}) \leq h(\text{mm}) \leq 2d(\text{mm}) \quad \text{(expression 1)}$$

is satisfied, where d (mm) represents a diameter of the agitation blade and h (mm) represents a height along a direction of the central axis of rotation of the agitation blade.

In another form of the agitation blade, the agitation blade is within a range from a diameter d1 (mm) to a diameter d (mm) around the central axis of rotation, and diameter d1 (mm) and diameter d (mm) satisfy $$0.5d \text{ (mm)} \leq d1 \text{ (mm)} \leq 0.8d \text{ (mm)}. \quad \text{(expression 2)}$$

In another form of the agitation blade, $$1 \text{ (mm)} \leq t \text{ (mm)} \leq 3 \text{ (mm)} \quad \text{(expression 3) and}$$

$$3 \text{ (mm)} \leq r \text{ (mm)} \leq 10 \text{ (mm)} \quad \text{(expression 4)}$$

are satisfied, where the blade portion has an arc having a radius r (mm) in contact with a centerline at a point of intersection between a straight line passing through a center of rotation and the diameter, with the central axis of rotation being defined as the center, and has a thickness t (mm)

In another form of the agitation blade, $$1 \text{ (mm)} \leq a \text{ (mm)} \leq (4 \text{ mm}) \quad \text{(expression 5) and}$$

$$0.1h \text{ (mm)} \leq b \text{ (mm)} \leq 0.4h \text{ (mm)} \quad \text{(expression 6)}$$

are satisfied, where h (mm) represents a height of the agitation blade, a (mm) represents a width of a slit, and b (mm) represents a depth of the slit.

In another form of the agitation blade, $$0.15h \text{ (mm)} \leq ha \text{ (mm)} \leq 0.8h \text{ (mm)} \quad \text{(expression 7)}$$

is satisfied, where h (mm) represents a height of the agitation blade and ha (mm) represents a height of an auxiliary blade.

In another form of the agitation blade, an interval between a lower end of the agitation blade and the agitation tank is from 0.5 mm to 1.0 mm.

Another form of an agitation apparatus has a contactless rotational drive mechanism and a center of gravity of an agitation blade as a whole is located below a second surface of a disk-shaped portion.

An agitation portion based on this invention is an agitation portion for agitating a liquid, and includes a rotation portion having a central axis of rotation and a first agitation portion provided on a side of a first surface of the rotation portion and a second agitation portion provided on a side of a second surface opposite to the first surface of the rotation portion.

Advantageous Effects of Invention

According to the present invention, an agitation blade, an agitation apparatus, a beverage preparation apparatus, and an agitation portion capable of realizing, in agitation of a liquid, fine foaming simultaneously with agitation can be provided.

DESCRIPTION OF EMBODIMENTS

Figure 1:
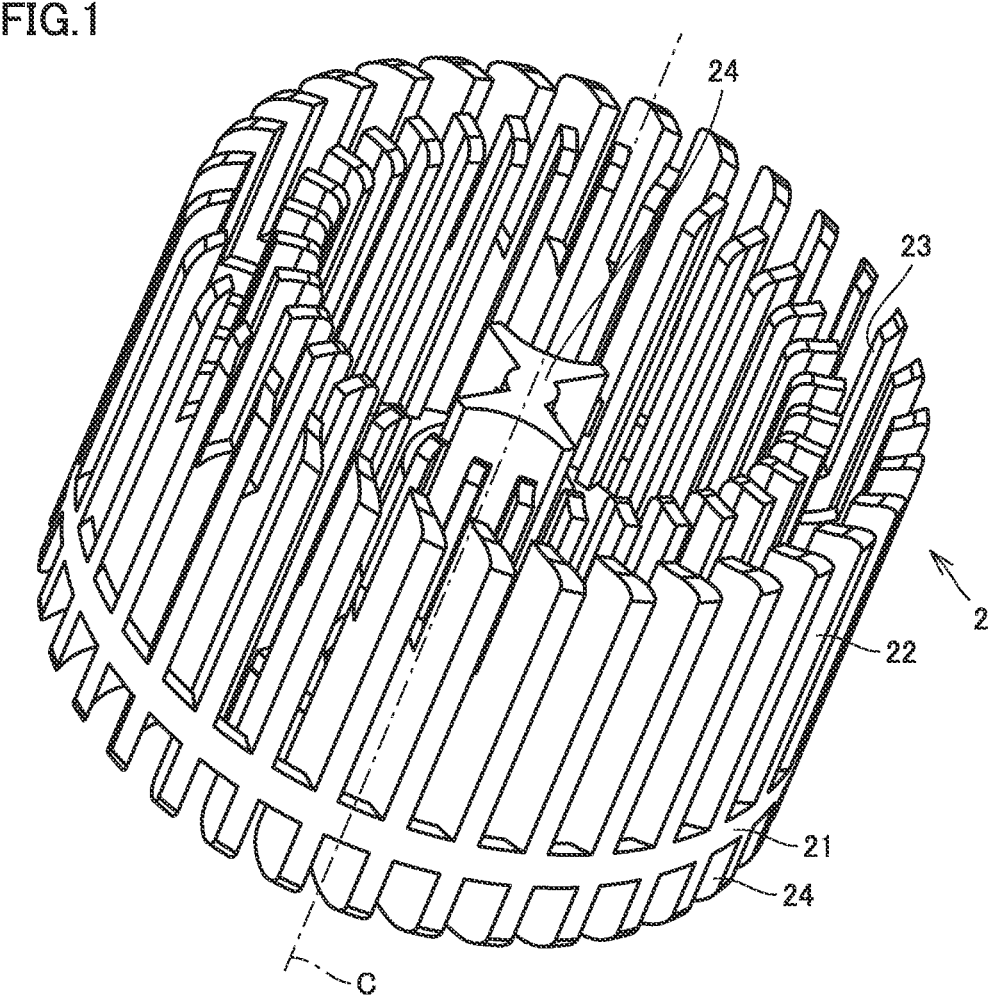
FIG. 1 is a perspective view showing a structure of an agitation blade in Embodiment 1.

An agitation blade, an agitation apparatus, and a beverage preparation apparatus in embodiments of the present invention will be described with reference to the drawings. In the drawings of each embodiment, the same or corresponding elements have the same reference numeral allotted and redundant description may not be repeated. When the number or an amount is mentioned in each embodiment, the scope of the present invention is not necessarily limited to the number or the amount unless otherwise specified.

Embodiment 1: Agitation Blade 2

An agitation blade 2 in Embodiment 1 based on the present invention will be described with reference to FIGS. 1 to 3. FIG. 1 is a perspective view showing a structure of agitation blade 2 in the present embodiment, FIG. 2 is a vertical cross-sectional view showing the structure of agitation blade 2 in the present embodiment, and FIG. 3 is a plan view showing a shape of a blade portion of agitation blade 2 in the present embodiment.

Figure 2:
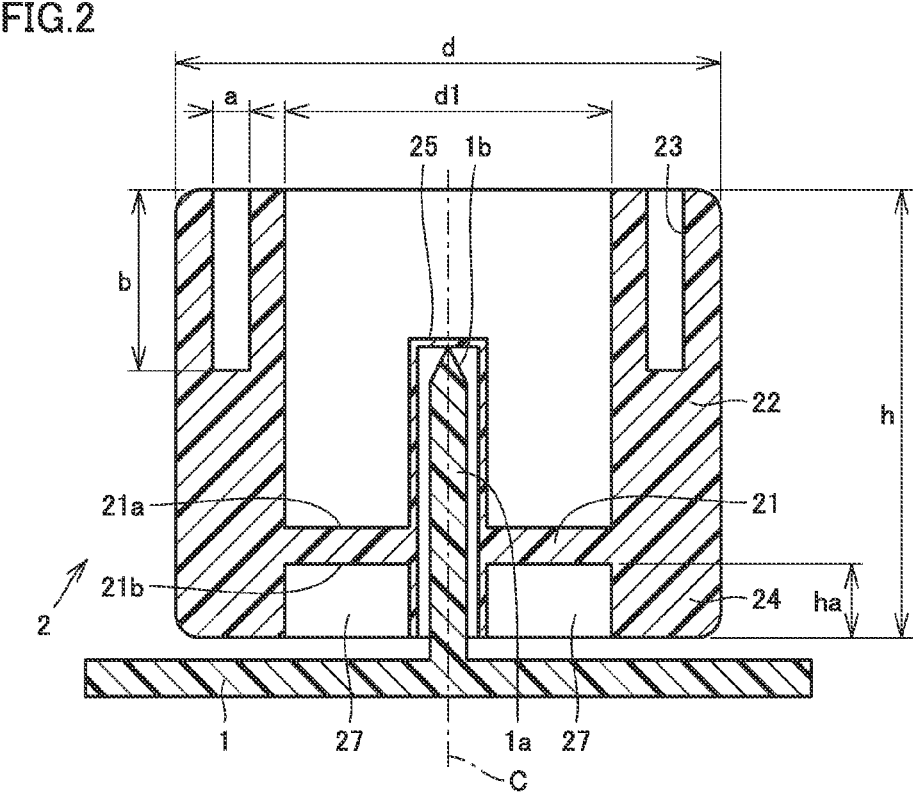
FIG. 2 is a vertical cross-sectional view showing the structure of the agitation blade in Embodiment 1.
Figure 3:
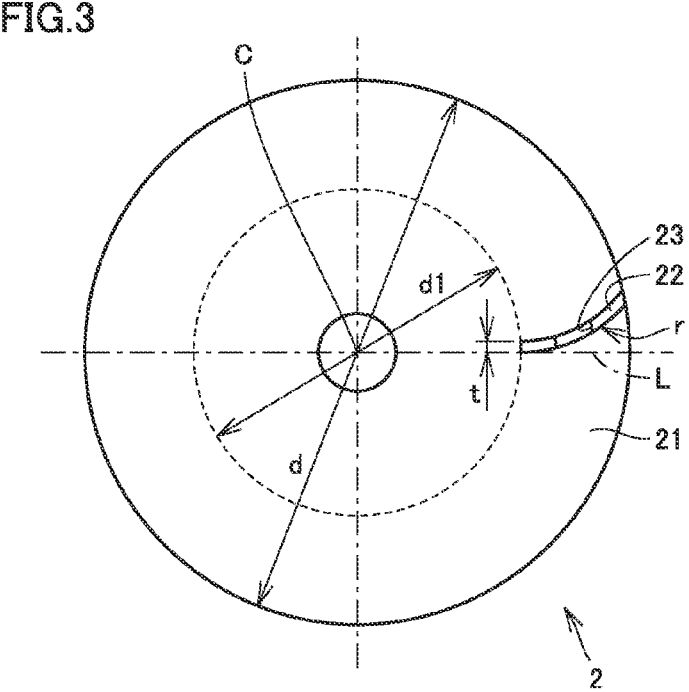
FIG. 3 is a plan view showing a shape of a blade portion of the agitation blade in Embodiment 1.

Referring to FIGS. 1 and 2, this agitation blade 2 is agitation blade 2 for agitating a liquid and includes a disk-shaped portion 21 as a rotation portion having a central axis of rotation C and a plurality of blade portions 22 provided on a side of a first surface 21a which is an upper side in illustration of this disk-shaped portion 21. Though blade portion 22 is provided in parallel to central axis of rotation C in the present embodiment, limitation to this construction is not intended. In the present embodiment, the blade portion means not only simply a site in a shape of a blade but also includes, for example, a shape of a toroidal coil and a dome, and includes all shapes contributing to foaming of a liquid.

Along central axis of rotation C, in the present embodiment, a cylindrical core 25 is provided on disk-shaped portion 21 in which an externally provided rotation shaft 1a can be inserted. A conical projection 1b is provided at a tip end of rotation shaft 1a.

Rotation shaft 1a is provided in an agitation tank 1 which will be described later, and implements a rotation support mechanism supporting a portion of contact with agitation tank 1 by point contact during rotation of agitation blade 2 as a vertex of conical projection 1b of rotation shaft 1a abuts to a bottom portion of cylindrical core 25. Here, an inner diameter of cylindrical core 25 is set to a diameter not allowing contact with an outer diameter of rotation shaft 1a.

The plurality of blade portions 22 are provided to surround central axis of rotation C and to be in rotation symmetry with respect to a center of rotation of central axis of rotation C. A tip end portion of blade portion 22 in the present embodiment is provided with a slit 23 extending from this tip end portion toward first surface 21a.

Furthermore, in the present embodiment, an auxiliary blade portion 24 extending downward is provided also on a side of a second surface 21b which is a lower side in illustration of disk-shaped portion 21, at a position opposed to blade portion 22. Auxiliary blade portion 24 is similar in shape to blade portion 22.

Referring to FIG. 3, a diameter φ d of agitation blade 2 is determined in accordance with an amount of an object to be agitated. For example, an outer diameter (diameter) d of φ34 mm, a height h of 22 mm, and ha of approximately 4 mm can represent one example of a shape of agitation blade 2.

$$\text{Desirably, } 0.2d \text{ (mm)} \leq h \text{ (mm)} \leq 2d \text{ (mm)} \quad \text{(expression 1)}$$

is satisfied, where d (mm) represents a diameter of agitation blade 2 and h (mm) represents a height along the direction of central axis of rotation C of agitation blade 2.

Agitation blade 2 is within a range from a diameter d1 (mm) to a diameter d (mm) around central axis of rotation C and diameter d1 and diameter d desirably satisfy $$0.5d \text{ (mm)} \leq d1 \text{ (mm)} \leq 0.8d \text{ (mm)} \quad \text{(expression 2)}.$$

Blade portion 22 has an arc shape having a radius r (in the present embodiment, r=5 mm) in contact with a centerline (a straight line passing through the center of rotation of the agitation blade) L at a point of intersection between centerline L and diameter d1 (in the present embodiment, φ d1=φ22 mm). Blade portion 22 has a thickness t around 1 mm. Slit 23 has a width around 3 mm and slit 23 has a depth (b) from the tip end portion of blade portion 22 around 8 mm.

Desirably, the shape of blade portion 22 satisfies $$1\ (\text{mm}) \leq t \leq 3\ (\text{mm}) \quad \text{(expression 3), and}$$

$$3\ (\text{mm}) \leq r \leq 10\ (\text{mm}) \quad \text{(expression 4).}$$

Desirably, $0.15h\ (\text{mm}) \leq ha\ (\text{mm}) \leq 0.8h\ (\text{mm})$ (expression 7)

is satisfied, where ha (mm) represents a height of the auxiliary blade.

By thus shaping blade portion 22 in an arc in contact with centerline L, a sufficient foaming function can be obtained. Furthermore, finer foaming is achieved by providing slit 23 in blade portion 22.

$$\text{Desirably, } 1\ (\text{mm}) \leq a\ (\text{mm}) \leq (4\ \text{mm}) \quad \text{(expression 5) and}$$

$$0.1h\ (\text{mm}) \leq b\ (\text{mm}) \leq 0.4h\ (\text{mm}) \quad \text{(expression 6)}$$

are satisfied, where h (mm) represents a height of the agitation blade, a (mm) represents a width of slit 23, and b (mm) represents a depth of slit 23.

Generally, with increase in number of times of passage and in area of the passage of blade portion 22 by an interface between air and a liquid (a liquid surface S), efficiency in foaming improves. By providing slit 23 in blade portion 22, the number of times of passage of blade portion 22 is doubled and air is cut to a size not greater than a width of slit 23. Therefore, finer foams can be obtained.

Specifically, the principles of foaming of a liquid in agitation tank 1 is such that foams are made finer by cutting large foams by shaking up the interface between air and a liquid with blade portion 22 while air is taken into the liquid. Agitation and foaming more efficient than in a conventional example can be achieved by intake of air by agitation blade 2, efficient agitation by making use of a vortex flow at this time, and passage of blade portion 22 of agitation blade 2 by the liquid surface which has varied by rotation and resultant shake-up of the liquid surface.

Figure 4:
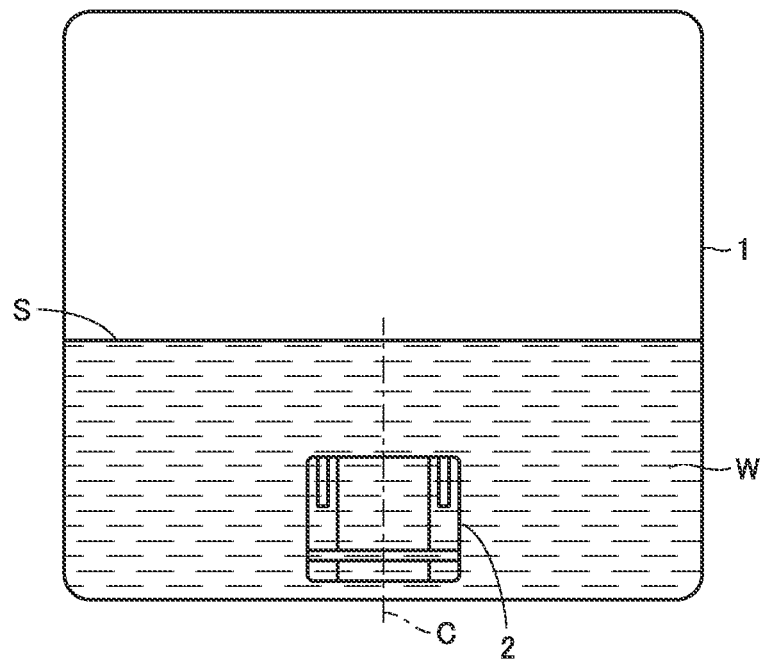
FIG. 4 is a first diagram showing an operation for agitation by the agitation blade in Embodiment 1.
Figure 5:
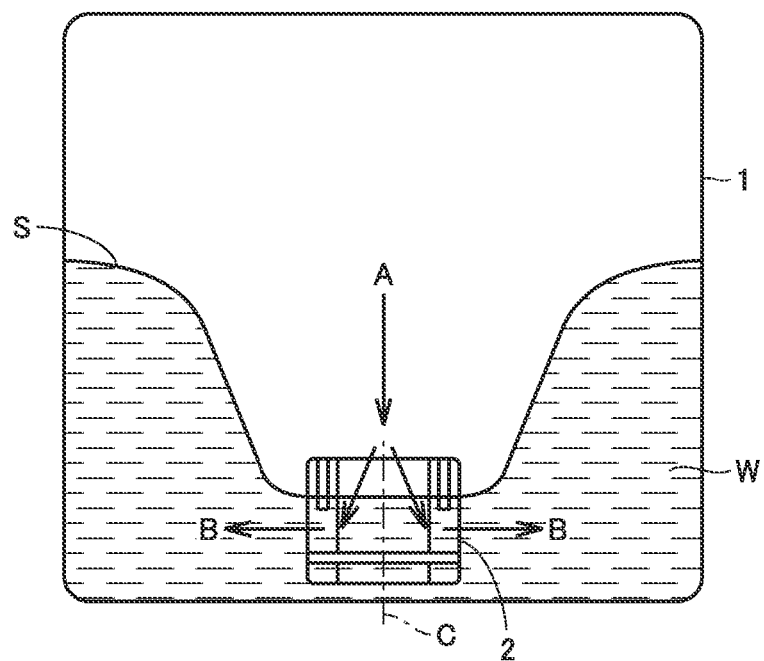
FIG. 5 is a second diagram showing an operation for agitation by the agitation blade in Embodiment 1.

Agitation and foaming by using agitation blade 2 will be described with reference to FIGS. 4 and 5. FIGS. 4 and 5 are first and second diagrams showing operations for agitation by agitation blade 2, respectively. Agitation blade 2 in the present embodiment implements a multi-blade fan used for agitation. The multi-blade fan aims to take in a fluid from a central portion as a result of rotation and to send the fluid toward an outer circumference. Agitation blade 2 is used as it rotates around rotation shaft 1a provided in agitation tank 1 which will be described later, and agitates water and an object to be agitated in agitation tank 1 with centrifugal force during rotation.

Referring to FIG. 4, while agitation blade 2 is not rotating, liquid surface S of a liquid W is located above and agitation blade 2 is immersed in liquid W.

Referring to FIG. 5, when agitation blade 2 rotates, force in a direction substantially orthogonal to central axis of rotation C (in the figure, in a horizontal direction: a direction shown with an arrow B in the figure) is applied to liquid W as a result of an agitation action by agitation blade 2. Consequently, liquid surface S in the central portion including central axis of rotation C is displaced below (a direction shown with an arrow A in the figure) and an upper portion of agitation blade 2 is exposed above liquid surface S.

Thus, air can be taken into liquid W in a region of agitation blade 2 exposed above liquid surface S. Simultaneously, air and the liquid to be agitated are sent from the central portion toward an outer circumferential portion of agitation blade 2, and air and the liquid are agitated while air is efficiently taken into the liquid.

As blade portion 22 of agitation blade 2 passes by the interface between air and liquid surface S, large foams are crushed and fine foams can efficiently be created. Here, efficiency in agitation is significantly improved with increase in number of blade portions 22 and number of rotations of agitation blade 2. Furthermore, in the present embodiment, slit 23 is provided in blade portion 22, so that large foams can more effectively be crushed and fine foams can efficiently be created.

For example, with the number of blade portions 22 being set to 33, 300 cc of a liquid is agitated in a tank of ϕ110 mm×60 mm high. By setting the number of rotations of agitation blade 2 in the present embodiment which has a dimension above to 1200 rpm to 3000 rpm (with no load being applied) or to 600 rpm to 1300 rpm (with load being applied), a tip end (an upper end) of agitation blade 2 protrudes from liquid surface S and reliably passes by the interface between air and the liquid (a state shown in FIG. 5). Consequently, sufficient agitation and foaming can be achieved. A position of a blade is optimized at a position offset by 13.5 mm from the center of the tank. Agitation blade 2 having this size is effective for a liquid of a volume not more than 300 cc. Sufficient foaming can be achieved when the volume is not more than 300 cc.

A direction of rotation here is reversible, and can be selected in accordance with an amount of intake of necessary air, the number of rotations, and a necessary velocity of flow. For example, when this velocity of flow is set to be high, a height of liquid surface S is ensured by centrifugal force, and when the velocity of flow is set to be low, a height of liquid surface S can be lowered.

Agitation blade 2 in the present embodiment is implemented by a multi-blade fan shape, and air and a liquid to be agitated can be sent from the central portion of the blade toward the outer circumferential portion so that agitation with efficient intake of air into the liquid can be achieved. Simultaneously, as the blade portion of the multi-blade fan passes by the interface between air and the liquid, large foams can be crushed and fine foams can efficiently be created. Consequently, simultaneously with agitation of powders and a liquid, foaming of the liquid can be achieved. Here, efficiency in agitation is significantly improved by increasing the number of blade portions 22 and the number of rotations of agitation blade 22.

The liquid surface is varied by centrifugal force resulting from rotation of agitation blade 2 and also by an amount of agitation and the number of rotations. Here, by setting a height of agitation blade 2 to be high, the blade more readily passes by the liquid surface, which favorably acts on agitation of a liquid at various levels and results in a wider allowable range of the number of rotations and an amount of agitation.

Agitation blade 2 in the present embodiment has slit 23 at the tip end portion of blade portion 22 in an arc shape, so that the number of times of contact of blade portion 22 of the multi-blade fan with the interface between air and the liquid increases. By providing slit 23 on a side of the tip end of blade portion 22, capability of intake of air is ensured. A position of the interface between air and a liquid is varied by an action of rotation and centrifuge, depending on a shape of a blade, the number of blades, and the number of rotations. Efficiency in agitation significantly improves and fine foaming can be realized by optimally controlling a position of the interface and achieving matching of positional relation with slit 23.

Though disk-shaped portion 21 is provided as the rotation portion in the present embodiment, the shape of the rotation portion is not limited to the disk shape. Any form of the rotation portion is applicable so long as blade portion 22 is coupled to cylindrical core 25.

Embodiment 2: Agitation Blade 2A

Figure 6:
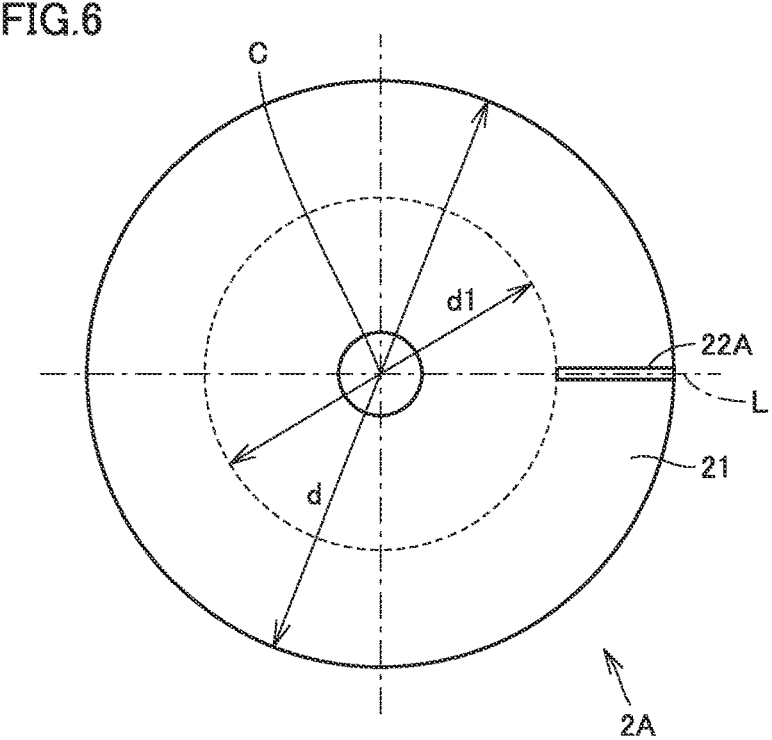
FIG. 6 is a plan view showing a shape of a blade portion of an agitation blade in Embodiment 2.

A shape of a blade portion 22A of an agitation blade 2A in the present embodiment will now be described with reference to FIG. 6. FIG. 6 is a plan view showing a shape of blade portion 22A of agitation blade 2A in the present embodiment. Though blade portion 22 in an arc shape is adopted and a slit is provided in Embodiment 1, a flat shape instead of an arc shape is adopted for blade portion 22A and no slit is provided in the present embodiment.

Though blade portion 22A in the present embodiment is provided along centerline L (a direction of radius), limitation thereto is not intended and blade portion 22A may be provided to intersect with centerline L. Basic dimensional relation is the same as in agitation blade 2 in Embodiment 1.

A sufficient agitation and foaming function can be obtained also by employing agitation blade 2A in this shape in accordance with an amount of an object to be agitated.

Embodiment 3: Agitation Blade 2B

Figure 7:
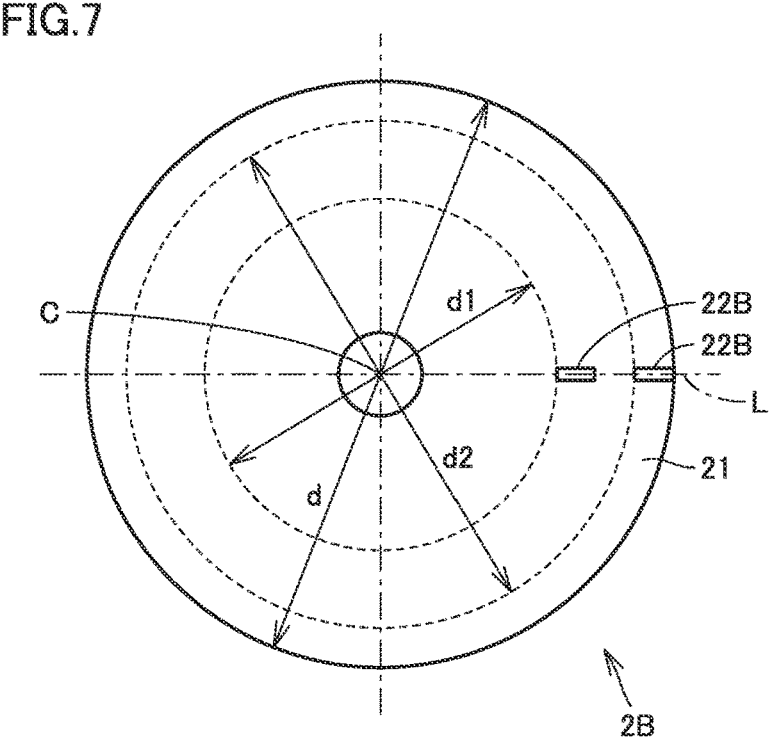
FIG. 7 is a plan view showing a shape of a blade portion of an agitation blade in Embodiment 3.
Figure 8:
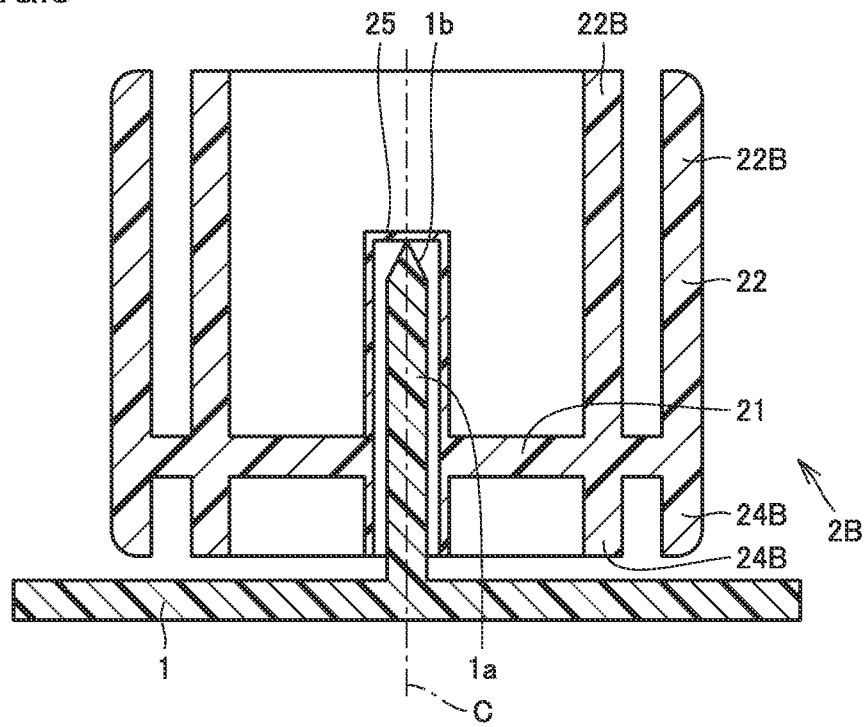
FIG. 8 is a vertical cross-sectional view showing a structure of the agitation blade in Embodiment 3.

A shape of a blade portion 22B of an agitation blade 2B in the present embodiment will now be described with reference to FIGS. 7 and 8. FIG. 7 is a plan view showing a shape of blade portion 22B of agitation blade 2B in the present embodiment, and FIG. 8 is a vertical cross-sectional view showing a structure of agitation blade 2B in the present embodiment.

In the present embodiment, two blade portions 22B are provided as being juxtaposed to each other, and a gap between two blade portions 22B is used as a slit.

Though blade portion 22B in the present embodiment is also provided along centerline L (a direction of radius), limitation thereto is not intended and blade portion 22B may be provided to intersect with centerline L. In the present embodiment, blade portion 22B has a width along the direction of radius around 1.5 mm and a gap between blade portions 22B is around 3 mm φ d2 is around 31 mm.

A sufficient agitation and foaming function can be obtained also by employing agitation blade 2B in this shape in accordance with an amount of an object to be agitated.

Embodiment 4: Agitation Blade 2C

Figure 9:
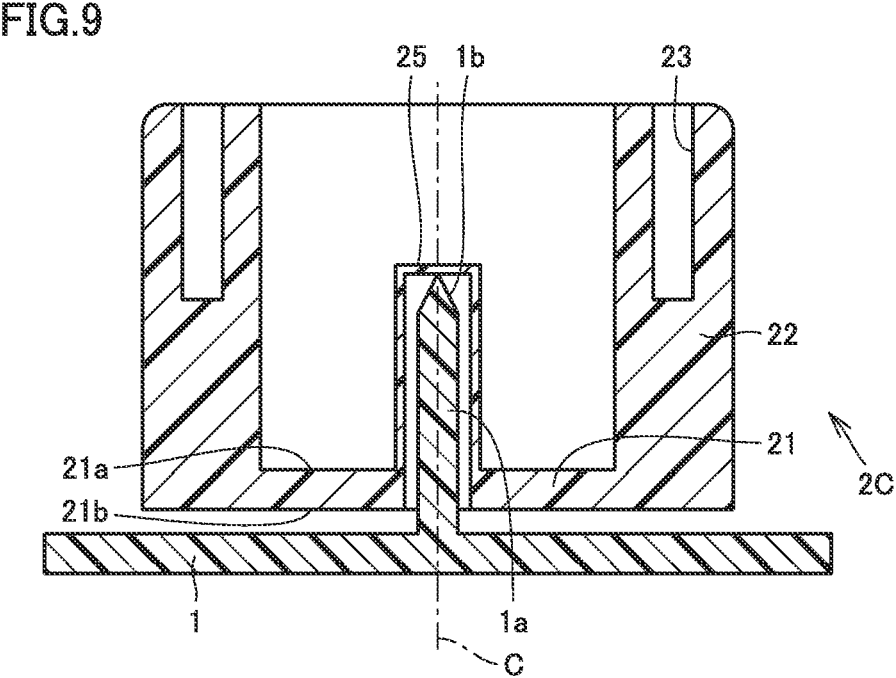
FIG. 9 is a vertical cross-sectional view showing a structure of an agitation blade in Embodiment 4.

A shape of an agitation blade 2C in the present embodiment will now be described with reference to FIG. 9. FIG. 9 is a vertical cross-sectional view showing a structure of agitation blade 2C in the present embodiment.

In the present embodiment, no auxiliary blade portion 24 is provided on the side of second surface 21b which is the lower side in illustration of disk-shaped portion 21, as compared with the structure of agitation blade 2 in Embodiment 1 shown in FIG. 2. Though not shown, a permanent magnet 4 is embedded in disk-shaped portion 21. Other features are the same as in agitation blade 2 in Embodiment 1.

Agitation blade 2C shown in the present embodiment can also be adopted.

Embodiment 5: Agitation Apparatus 1500

Figure 10:
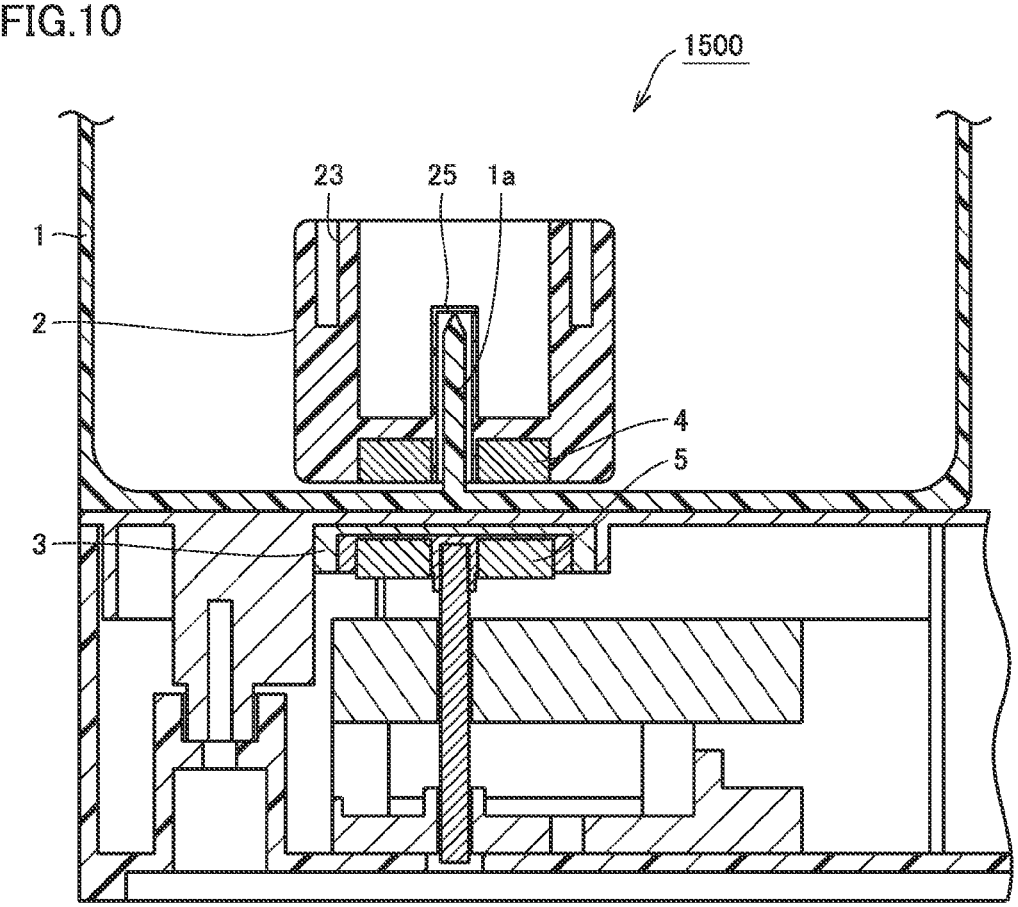
FIG. 10 is a partial cross-sectional view showing a structure of an agitation apparatus in Embodiment 5.
Figure 11:
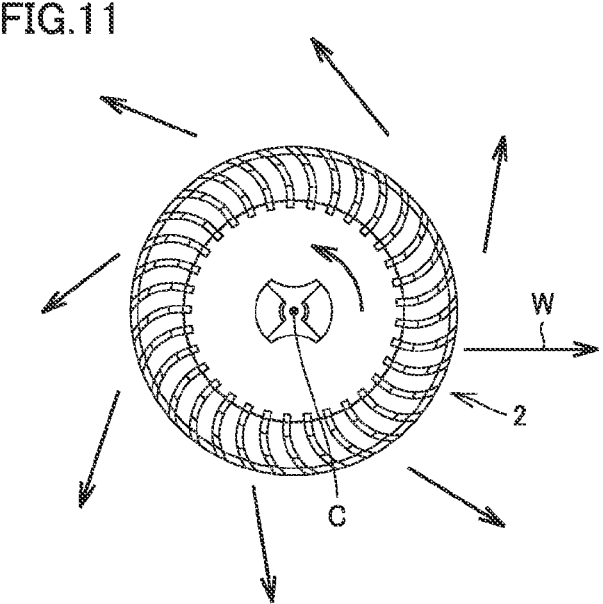
FIG. 11 is a diagram two-dimensionally showing a flow of water by an agitation blade of the agitation apparatus in Embodiment 5.
Figure 12:
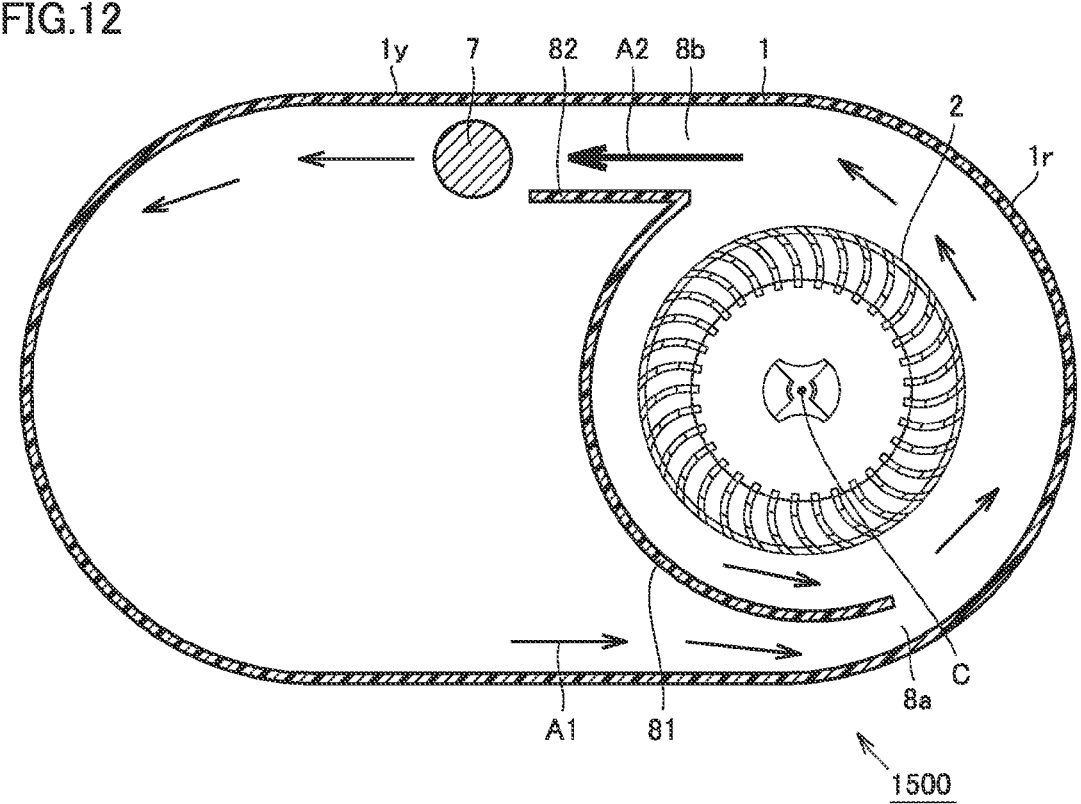
FIG. 12 is a plan view showing a construction of a rectifying wall provided in the agitation apparatus in Embodiment 5.

A structure of an agitation apparatus 1500 in the present embodiment will now be described with reference to FIGS. 10 to 12. FIG. 10 is a partial cross-sectional view showing a structure of agitation apparatus 1500 in the present embodiment, FIG. 11 is a diagram two-dimensionally showing a flow of water by agitation blade 2 of agitation apparatus 1500 in the present embodiment, and FIG. 12 is a plan view showing a construction of a rectifying wall provided in agitation apparatus 1500 in the present embodiment.

Though a case that agitation blade 2 described in Embodiment 1 is employed in agitation apparatus 1500 in the present embodiment is described in the description below, agitation blade 2A in Embodiment 2, agitation blade 2B in Embodiment 3, and agitation blade 2C in Embodiment 4 may be employed.

Referring to FIG. 10, agitation apparatus 1500 in the present embodiment has an agitation structure in which powders and a liquid introduced into agitation tank 1 are agitated and foamed. Rotation shaft 1a is provided on a bottom surface of agitation tank 1. Agitation blade 2 has rotation shaft 1a inserted in cylindrical core 25 provided therein and can rotate around this rotation shaft 1a.

A rotation support mechanism supporting a portion of contact with agitation tank 1 by point contact during rotation of agitation blade 2 is implemented as a vertex of conical projection 1b of rotation shaft 1a abuts to the bottom portion of cylindrical core 25. An interval between a lower end of agitation blade 2 and agitation tank 1 is desirably set to 0.5 mm to 1.0 mm. Even when a small amount of powders is agitated, a liquid and powders can effectively be agitated.

Permanent magnet 4 is fixed to a side of the bottom surface of agitation blade 2. A rotational drive mechanism 3 to which a permanent magnet 5 is fixed is provided under agitation tank 1. An electric motor is employed for rotational drive mechanism 3 in the present embodiment. An electromagnet may be employed instead of permanent magnets 4 and 5.

Permanent magnet 4 provided on the side of the bottom surface of agitation blade 2 and permanent magnet 5 provided in rotational drive mechanism 3 are arranged such that magnetic force thereof attract each other, and a contactless rotational drive mechanism transmitting rotational force of rotational drive mechanism 3 to agitation blade 2 without contact is provided between agitation blade 2 and rotational drive mechanism 3.

A flow of water by agitation blade 2 in this agitation apparatus 1500 will now be described with reference to FIGS. 11 and 12. FIG. 11 shows a flow of water generated by agitation blade 2. Agitation blade 2 in the present embodiment takes in air and a liquid from an upper central portion (see FIG. 5) and radially emits air and the liquid around agitation blade 2 (an arrow W).

Referring to FIG. 12, when this agitation blade 2 is arranged in agitation tank 1, agitation tank 1 is shaped like a track in a two-dimensional view and agitation blade 2 is arranged closer to one semicircular wall 1r. In this case, the center of a radius of one semicircular wall 1r desirably coincides with central axis of rotation C of agitation blade 2.

Then, a curved rectifying wall 81 surrounds a side of agitation blade 2 opposite to one semicircular wall 1r of agitation tank 1. The center of the radius of curved rectifying wall 81 desirably coincides with central axis of rotation C of agitation blade 2. Furthermore, a linear rectifying wall 82 is provided to be in parallel to a linear wall 1y of agitation tank 1 on a downstream side (an exit side) in a direction of rotation of agitation blade 2. One end of curved rectifying wall 81 and one end of linear rectifying wall 82 are coupled to each other.

A fluid inlet portion 8a through which a liquid flows in between agitation tank 1 and the agitation blade is formed on an upstream side of curved rectifying wall 81 in the direction of rotation of agitation blade 2. A fluid exit 8b through which a liquid flows out between agitation tank 1 and the agitation blade is formed on the downstream side of linear rectifying wall 82 in the direction of rotation of agitation blade 2.

When agitation blade 2 is rotated in agitation tank 1 having the construction above, a liquid flow A1 shown with an arrow in FIG. 12 is formed in agitation tank 1. Since a velocity of flow of a liquid flow A2 is high particularly at fluid exit 8b, a position of introduction of powders to be agitated is set at a position 7 on the downstream side of fluid exit 8b.

For example, such a phenomenon that fine powders on a micro level (powders of tea leaves) aggregate like clay when they absorb water and stick to a wall and a bottom surface of agitation tank 1 and do not come off from the wall and the bottom surface and/or such a phenomenon that powders are clumpy (form a lump) is/are observed.

When powders to be agitated are introduced at position 7 early in velocity of flow, the powders are dissolved in water without sticking to the wall. Even when powders are clumpy (form a lump), the clumpy powders (lump) abut to agitation blade 2 when the powders pass by agitation blade 2 and the clumpy powders (lump) are crushed by agitation blade 2.

Furthermore, agitation blade 2 is provided with auxiliary blade portion 24 extending downward. Thus, auxiliary blade portion 24 is arranged at a position close to the bottom surface of agitation tank 1 and can sweep and emit the powders above or directly under agitation blade 2 outward in a centrifugal direction.

Thus, according to agitation apparatus 1500 in the present embodiment, agitation tank 1 in which agitation is carried out has a rectifying wall for rectifying a vortex flow created by agitation blade 2 so that a fast flow of water can be created at any position.

Though such a phenomenon that fine powders aggregate like clay when they absorb water and stick to the wall and/or the bottom surface in agitation tank 1 and do not come off or a phenomenon of clumping (lump) of powders is observed, the powders are dissolved into a liquid without being clumpy (forming a lump), by creating a fast flow of water by providing a thin flow path at a position of introduction of powders in agitation tank 1 and by swiftly feeding a liquid to a portion where powders are present.

In addition, auxiliary blade portion 24 on the side of the bottom surface of agitation blade 2 is arranged at a position close to the bottom surface of agitation tank 1, so that powders above or directly under agitation blade 2 can be swept and emitted in the centrifugal direction.

Embodiment 6: Another Rotation Support Mechanism

Figure 13:
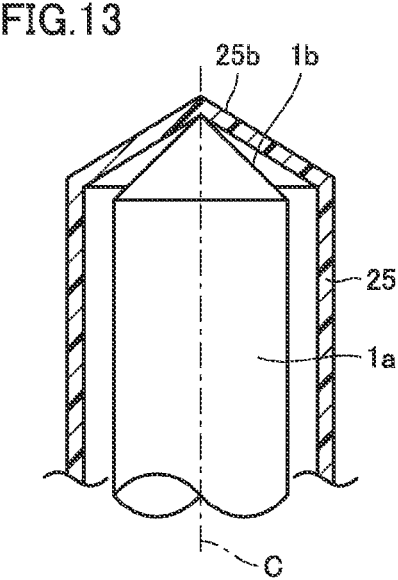
FIG. 13 is a partial cross-sectional view showing a structure of another rotation support mechanism provided in an agitation apparatus in Embodiment 6.

Another rotation support mechanism adopted in agitation apparatus 1500 will be described with reference to FIG. 13. FIG. 13 is a partial cross-sectional view showing a structure of another rotation support mechanism provided in the present embodiment.

In Embodiment 5, as shown in FIGS. 2 and 9, a rotation support mechanism supporting a portion of contact with agitation tank 1 by point contact during rotation of agitation blade 2 as a vertex of conical projection 1b of rotation shaft 1a abuts to the bottom portion of cylindrical core 25 has been adopted.

In the present embodiment, as shown in FIG. 13, an inclined recessed bottom portion 25b which looks projecting upward is provided at the tip end portion of cylindrical core 25. Here, an inner diameter of cylindrical core 25 is set to a diameter not allowing contact with an outer diameter of rotation shaft 1a.

Since a portion of contact between rotation shaft 1a and cylindrical core 25 is limited to the vertex of conical projection 1b and a vertex of inclined recessed bottom portion 25b during rotation of agitation blade 2, loss due to friction can be minimized. Since occurrence of displacement of a shaft due to wear can also be suppressed, durability in long-term use can be achieved. Consequently, rotation can efficiently be transmitted in a contactless rotational drive mechanism which uses magnetic force.

In addition, the vertex of conical projection 1b is located at the vertex of inclined recessed bottom portion 25b during rotation of agitation blade 2, so that rotation of agitation blade 2 can further be stabilized.

Embodiment 7: Another Rotation Support Mechanism

Figure 14:
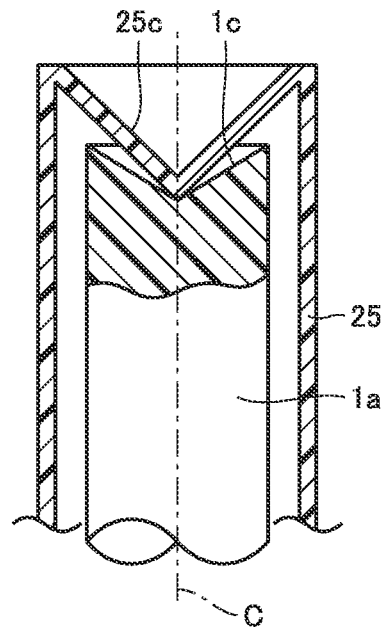
FIG. 14 is a partial cross-sectional view showing a structure of another rotation support mechanism provided in an agitation apparatus in Embodiment 7.

Another rotation support mechanism adopted in agitation apparatus 1500 will be described with reference to FIG. 14. FIG. 14 is a partial cross-sectional view showing a structure of another rotation support mechanism in the present embodiment.

In Embodiment 6, as shown in FIG. 13, conical projection 1b is provided at the tip end of rotation shaft 1a and inclined recessed bottom portion 25b is provided at the bottom portion of cylindrical core 25. In the present embodiment, as shown in FIG. 14, with projection and recess being reversed, a conical recess 1c is provided at the tip end of rotation shaft 1a and an inclined projecting bottom portion 25c is provided at the bottom portion of cylindrical core 25.

Even with the rotation support mechanism formed from combination of conical recess 1c and inclined projecting bottom portion 25c, a function and effect as in Embodiment 6 can be obtained.

Embodiment 8: Another Rotation Support Mechanism

Figure 15:
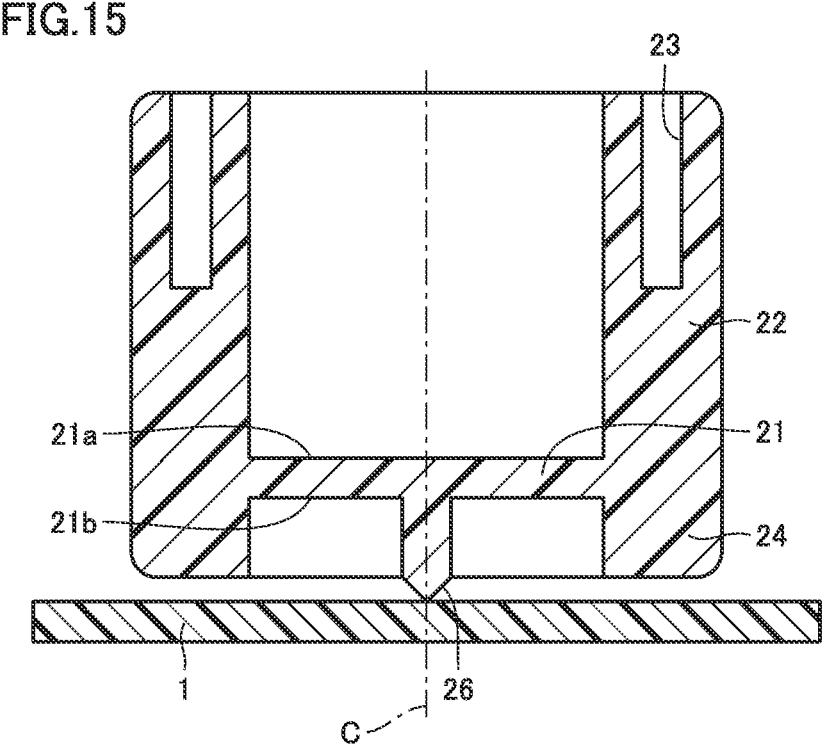
FIG. 15 is a partial cross-sectional view showing a structure of another rotation support mechanism provided in an agitation apparatus in Embodiment 8.

Another rotation support mechanism adopted in agitation apparatus 1500 will be described with reference to FIG. 15. FIG. 15 is a partial cross-sectional view showing a structure of another rotation support mechanism in the present embodiment. The contactless rotational drive mechanism including permanent magnets 4 and 5 is not shown.

In the present embodiment, a rotation shaft 26 implementing central axis of rotation C is provided on the side of second surface 21b of disk-shaped portion 21 of agitation blade 2, without providing rotation shaft 1a in agitation tank 1. When permanent magnet 5 provided on the side of agitation tank 1 starts to rotate by means of the not-shown contactless rotational drive mechanism, agitation blade 2 in the present embodiment starts to rotate in a stable manner while keeping balance based on the principles of a spinning top.

Since it is thus not necessary to provide rotation shaft 1a in agitation tank 1, a structure of agitation tank 1 can be simplified and an operation to clean agitation tank 1 is facilitated. Simply by placing agitation blade 2 on the bottom surface of agitation tank 1, agitation blade 2 can be rotated with the use of the contactless rotational drive mechanism.

In addition, by combining the contactless rotational drive mechanism and rotation shaft 26 in the present embodiment, it is not necessary to employ a dedicated agitation tank while agitation within a range where magnetic force is applied can be achieved. For example, the structure in the present embodiment can be employed also for an agitation tank made of a material in which it is difficult to provide a shaft, such as ceramics or a paper cup. Therefore, agitation by inserting the agitation blade in a tea cup, a mug cup, or a paper cup can be achieved.

Embodiment 9: Another Rotation Support Mechanism

Figure 16:
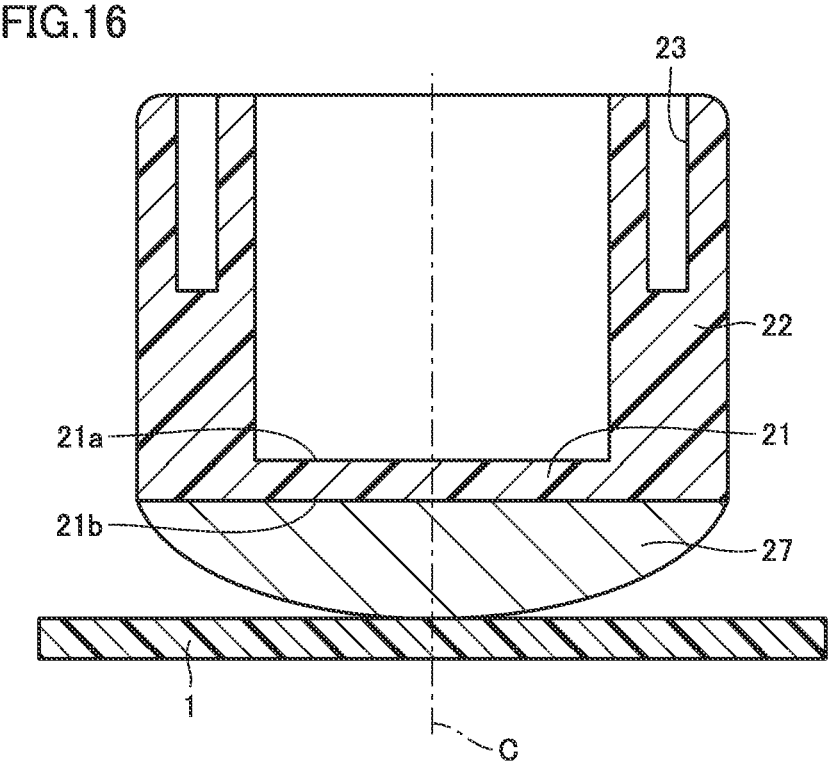
FIG. 16 is a partial cross-sectional view showing a structure of another rotation support mechanism provided in an agitation apparatus in Embodiment 9.

Another rotation support mechanism adopted in agitation apparatus 1500 will be described with reference to FIG. 16. FIG. 16 is a partial cross-sectional view showing a structure of another rotation support mechanism in the present embodiment. The contactless rotational drive mechanism including permanent magnets 4 and 5 is not shown.

In the present embodiment, a mass balance 27 in a downwardly curved shape is provided on the side of second surface 21b of disk-shaped portion 21 of agitation blade 2, without providing rotation shaft 1a in agitation tank 1. This mass balance 27 is made of a homogenous material, and the center of gravity of agitation blade 2 as a whole is located in mass balance 27 below second surface 21b of disk-shaped portion 21. Thus, agitation blade 2 rests in a state shown in FIG. 16, based on the principles similar to a roly-poly.

When permanent magnet 5 provided on the side of agitation tank 1 starts to rotate by means of the contactless rotational drive mechanism, agitation blade 2 in the present embodiment starts to rotate in a stable manner while keeping balance. With rotation of agitation blade 2, central axis of rotation C passing through the center of gravity of agitation blade 2 is formed.

Thus, in the present embodiment as well, it is not necessary to provide rotation shaft 1a in agitation tank 1 and thus the structure of agitation tank 1 is simplified and an operation to clean agitation tank 1 is facilitated. Simply by placing agitation blade 2 on the bottom surface of agitation tank 1, agitation blade 2 can be rotated with the use of the contactless rotational drive mechanism.

Embodiment 10: Beverage Preparation Apparatus 2000

Figure 17:
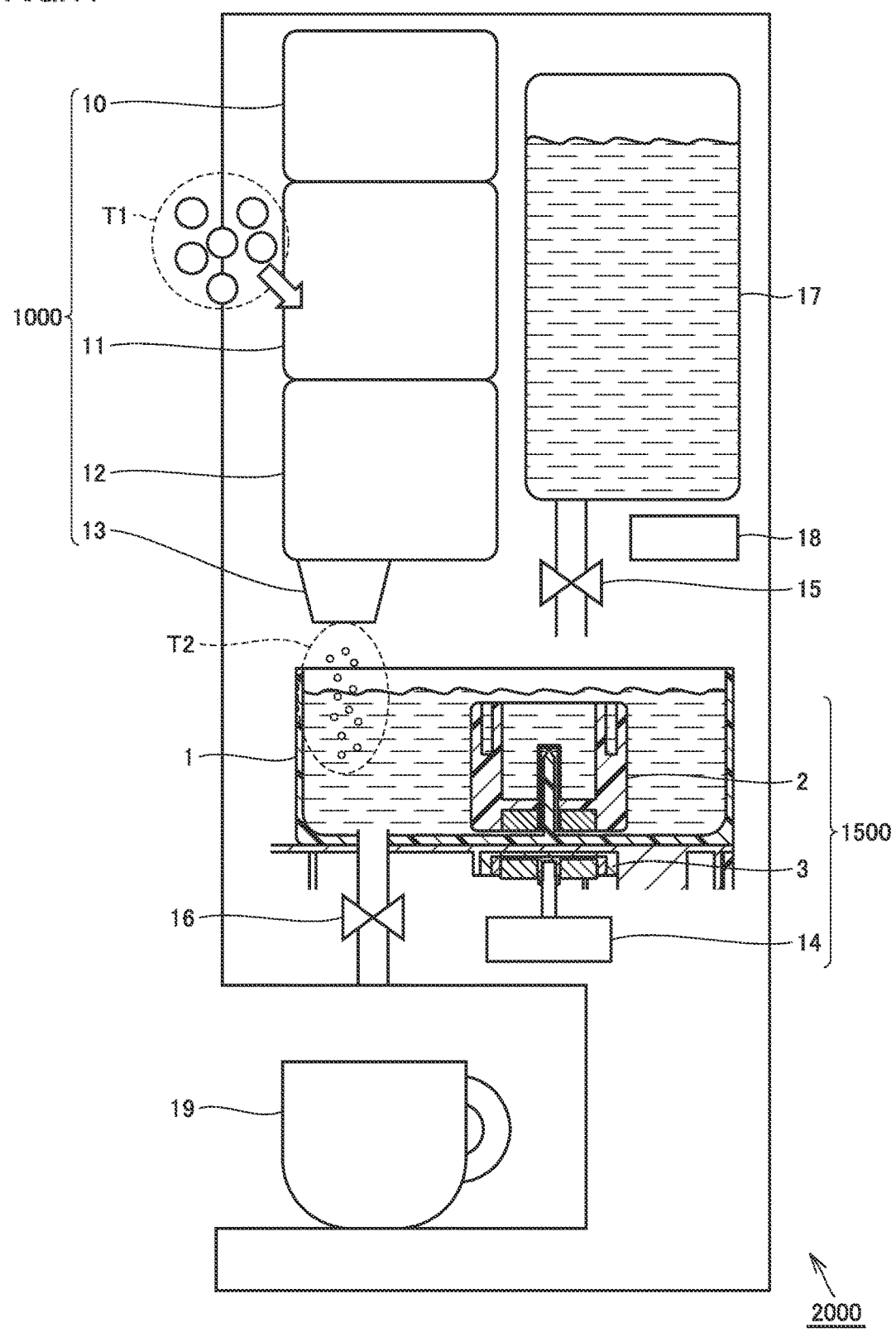
FIG. 17 is a vertical cross-sectional view showing a beverage preparation apparatus in Embodiment 10.
Figure 18:
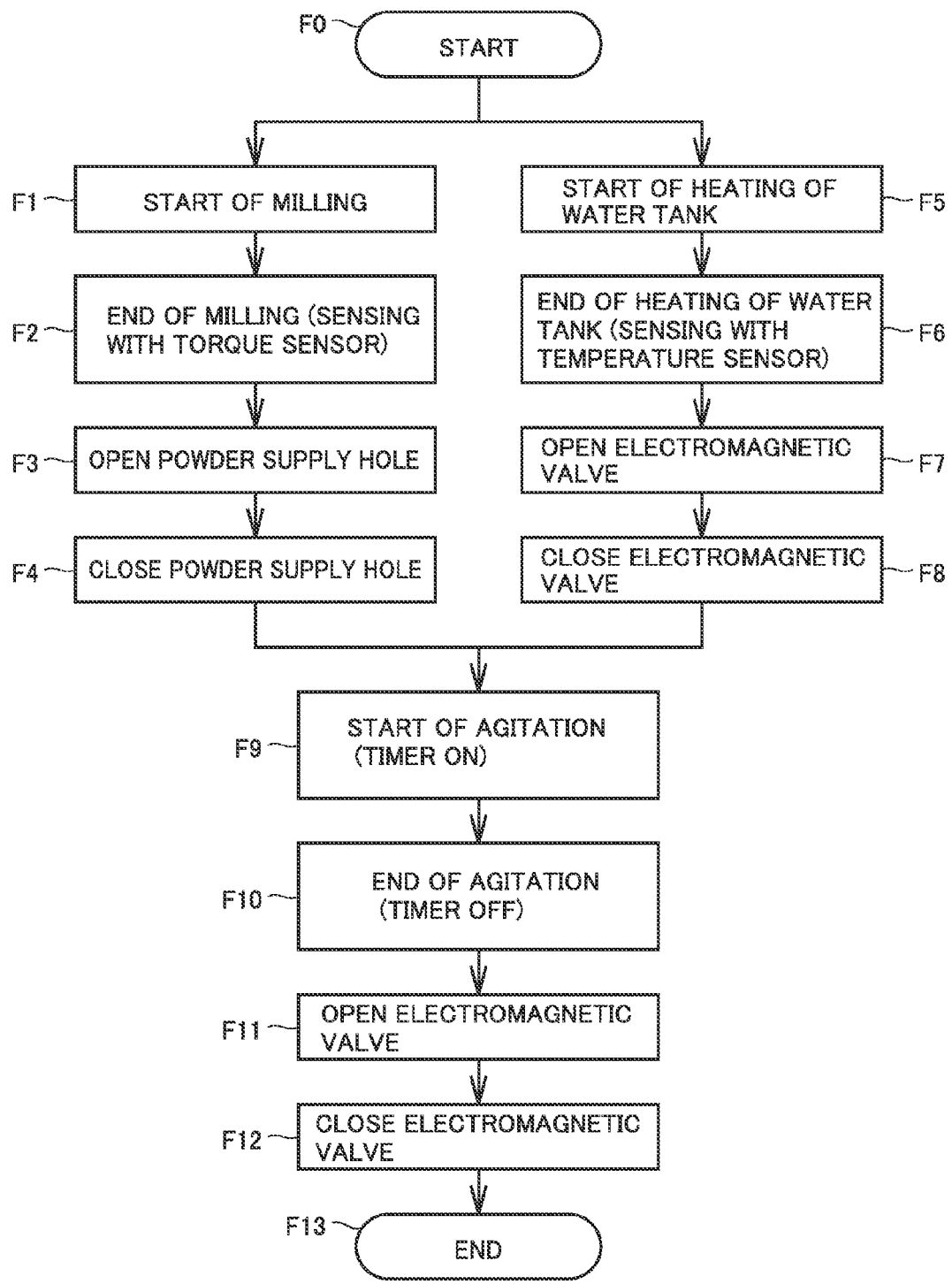
FIG. 18 is a block diagram showing an operation flow in the beverage preparation apparatus in Embodiment 10.

A structure of a beverage preparation apparatus 2000 including the agitation blade and the agitation apparatus in each embodiment above will be described with reference to FIGS. 17 and 18. FIG. 17 is a vertical cross-sectional view showing a structure of beverage preparation apparatus 2000 in the present embodiment, and FIG. 18 is a block diagram showing an operation flow in beverage preparation apparatus 2000 in the present embodiment. Though a case that agitation blade 2 and agitation apparatus 1500 are adopted is shown in FIG. 17, features in other embodiments can be adopted as appropriate.

Beverage preparation apparatus 2000 in the present embodiment serves as a mechanism for pulverizing food such as tea leaves and a mechanism for agitating a liquid, and provides a foamed drink by agitating powdered food (tea leaves) and hot water or water.

Beverage preparation apparatus 2000 in the present embodiment includes a milling machine 1000, a tank 17 storing liquid W, and agitation apparatus 1500 having agitation tank 1 supplied with powders T2 obtained by milling machine 1000 and liquid W, for mixing powders T2 and liquid W.

A stonemill suitable for microparticulation of an object to be grated is employed as milling machine 1000, and freshly milled powders are made use of.

Milling machine 1000 includes a rotational drive portion 10, a grating portion 11, a storage portion 12, and a supply hole 13. Rotation by rotational drive portion 10 is transmitted to grating portion 11. For example, an object to be grated T1 such as tea leaves is grated by grating portion 11 and grated powders T2 are stored in storage portion 12.

Tank 17 stores such a liquid as water. Tank 17 is heated as necessary by a heater 18. A liquid in tank 17 is introduced into agitation tank 1 as an electromagnetic valve 15 opens and closes at prescribed timing. Powders T2 stored in storage portion 12 are dispensed into agitation tank 1 through supply hole 13 at prescribed timing.

Agitation blade 2 is rotatably placed in agitation tank 1. As an agitation drive portion 14 rotates at prescribed timing and rotational drive mechanism 3 transmits rotation to agitation blade 2, agitation blade 2 agitates a liquid and powders T2.

Agitation blade 2 produces a vortex flow in agitation tank 1 and produces fine foams by taking in air from a water surface and by shearing air with the blade portion. Fine foams make texture of an agitated drink milder and enhances palatability. Desirably, rotational drive mechanism 3 is implemented, for example, by a magnet and agitation blade 2 is rotated by magnetic force without contact. Thus, attachment and removal of agitation tank 1 is easy and ease in cleaning improves.

A liquid agitated in agitation tank 1 is poured into a cup 19 as an electromagnetic valve 16 is opened and closed at prescribed timing. In the present embodiment, a drink can directly be poured into favorite cup 19.

FIG. 18 shows a more detailed operation flow in beverage preparation apparatus 2000. As a start signal is input to beverage preparation apparatus 2000 (F0), start of milling (F1) by milling machine 1000 and start of heating of a water tank (F5) are performed in parallel. As end of milling (F2) by milling machine 1000 is sensed by a torque sensor, a hole for supply of powders is opened (F3) so that powders T2 are introduced into agitation tank 1 from supply hole 13. Thereafter, the hole for supply of powders is closed (F4).

As end of heating of the water tank (F6) is sensed by a temperature sensor, electromagnetic valve 15 is opened (F7) so that hot water is supplied into agitation tank 1. Thereafter, electromagnetic valve 15 is closed (F8).

As powders T2 and hot water are introduced into agitation tank 1, agitation by rotation by agitation blade 2 is started in agitation tank 1 (F9). After agitation for a certain period of time is counted by a timer, agitation by rotation by agitation blade 2 ends (F10). After agitation by agitation blade 2, electromagnetic valve 16 is opened (F11) so that a drink is poured into cup 19. Thereafter, electromagnetic valve 16 is closed (F12) and the operation flow in beverage preparation apparatus 2000 ends (F13).

Thus, according to beverage preparation apparatus 2000 in the present embodiment, a drink having fine foams without clumpy powders (lump) can be obtained by using the agitation blade and the agitation apparatus including the agitation blade in the embodiment.

Embodiment 11: Beverage Preparation Apparatus 2000A

Figure 19:
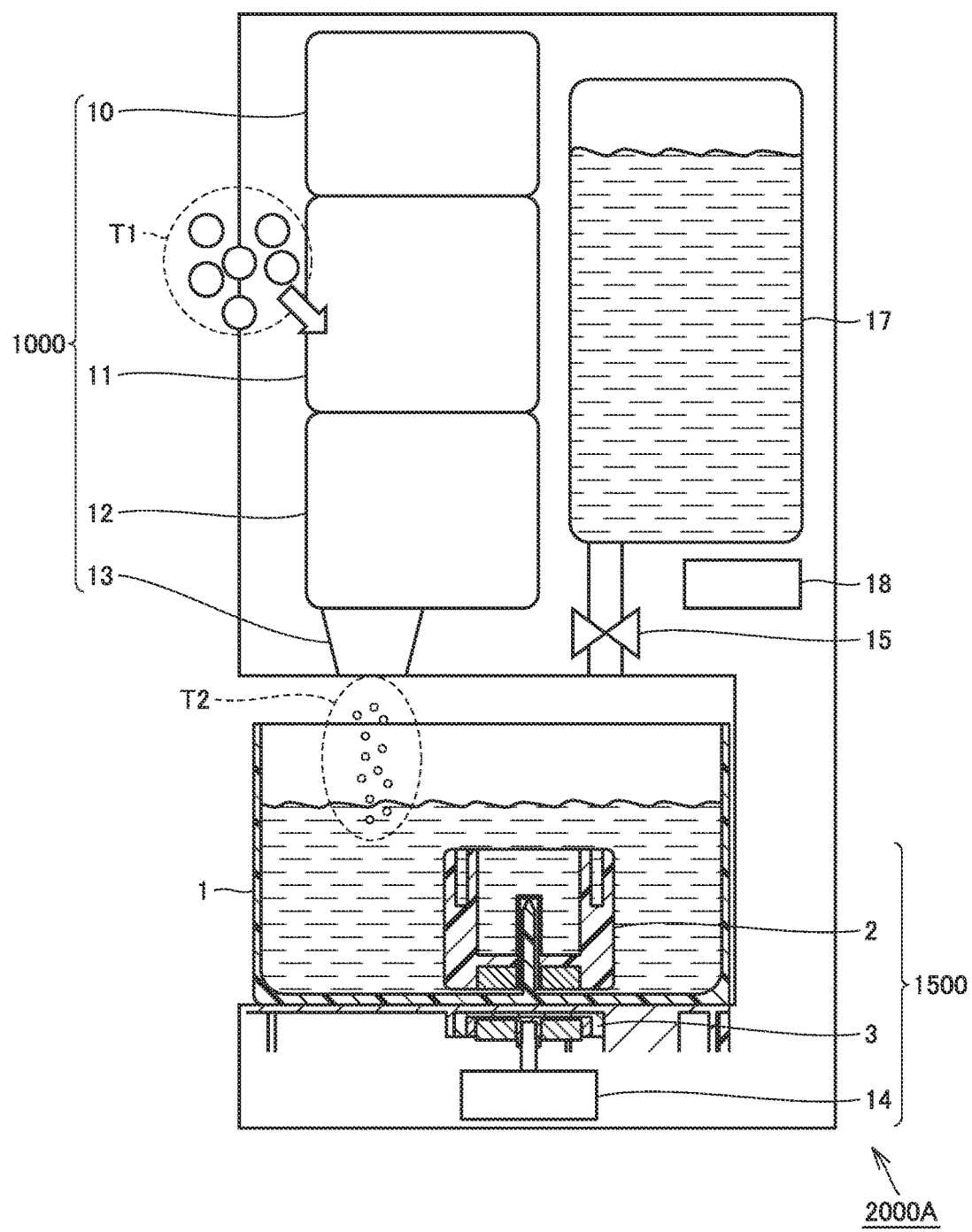
FIG. 19 is a vertical cross-sectional view showing a beverage preparation apparatus in Embodiment 11.
Figure 20:
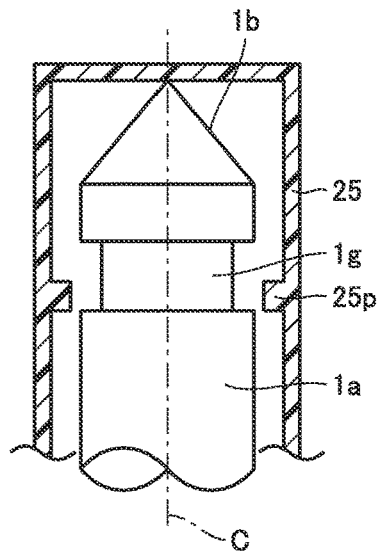
FIG. 20 is a partially enlarged vertical cross-sectional view showing a structure of a tip end portion of a rotation shaft employed in the beverage preparation apparatus in Embodiment 11.

A structure of a beverage preparation apparatus 2000A in the present embodiment will be described with reference to FIGS. 19 and 20. FIG. 19 is a vertical cross-sectional view showing a structure of beverage preparation apparatus 2000A in the present embodiment, and FIG. 20 is a partially enlarged vertical cross-sectional view showing a structure of a tip end portion of rotation shaft 1a. Though FIG. 19 shows a case that agitation blade 2 and agitation apparatus 1500 are adopted, features in other embodiments can be adopted as appropriate.

Beverage preparation apparatus 2000A in the present embodiment is the same in basic construction as beverage preparation apparatus 2000 in the embodiment above. A difference resides in that agitation tank 1 is removably provided and agitation tank 1 serves also as a beverage container (a pitcher). After agitation is completed, a user takes out agitation tank 1 and pours a drink into a cup of the user. Therefore, since agitation tank 1 can readily be cleaned, a beverage preparation apparatus higher in ease in cleaning and more inexpensive can be provided.

In pouring a drink from agitation tank 1, agitation blade 2 desirably does not readily fall off. In the present embodiment, as shown in FIG. 20, such a construction is adopted that a groove 1g is provided in an outer circumferential surface of rotation shaft 1a provided in agitation tank 1 and a protrusion 25p provided on an inner wall of cylindrical core 25 of agitation blade 2 is engaged with groove 1g in rotation shaft 1a when agitation tank 1 is tilted.

Embodiment 12: Agitation Blade 2D

Figure 21:
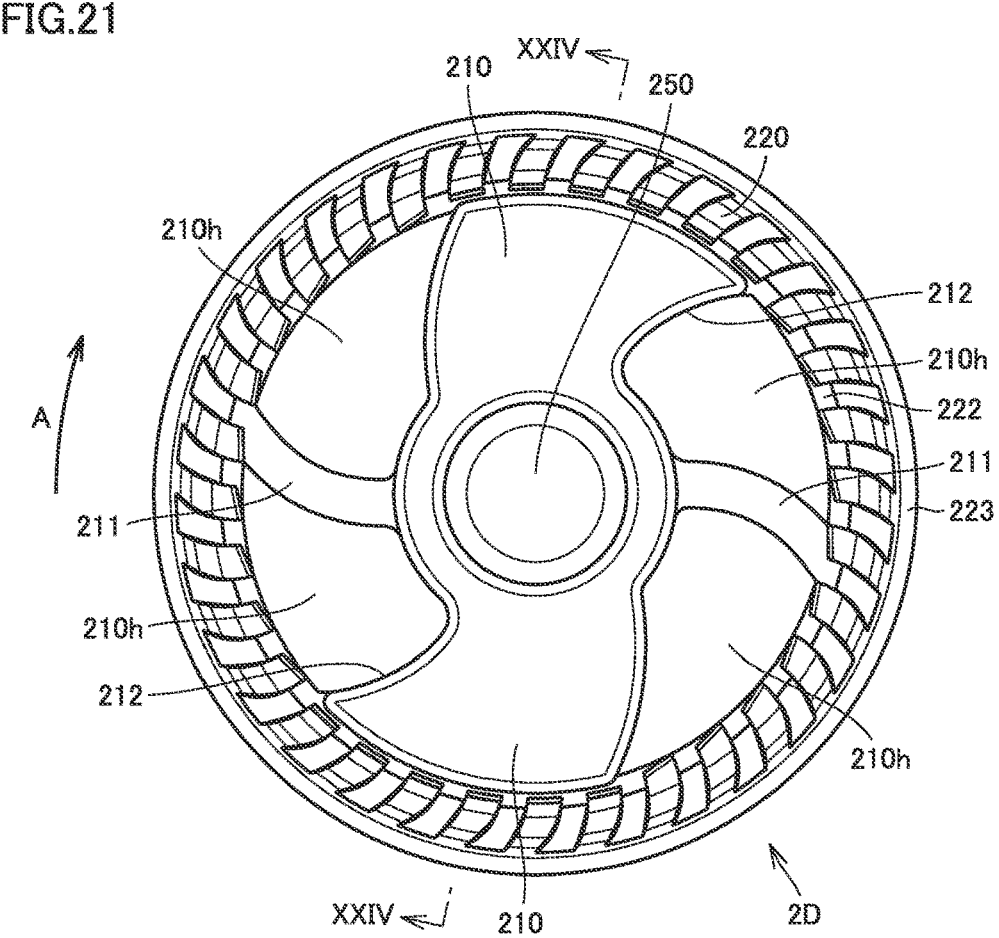
FIG. 21 is a plan view showing a shape of an agitation blade in Embodiment 12.
Figure 23:
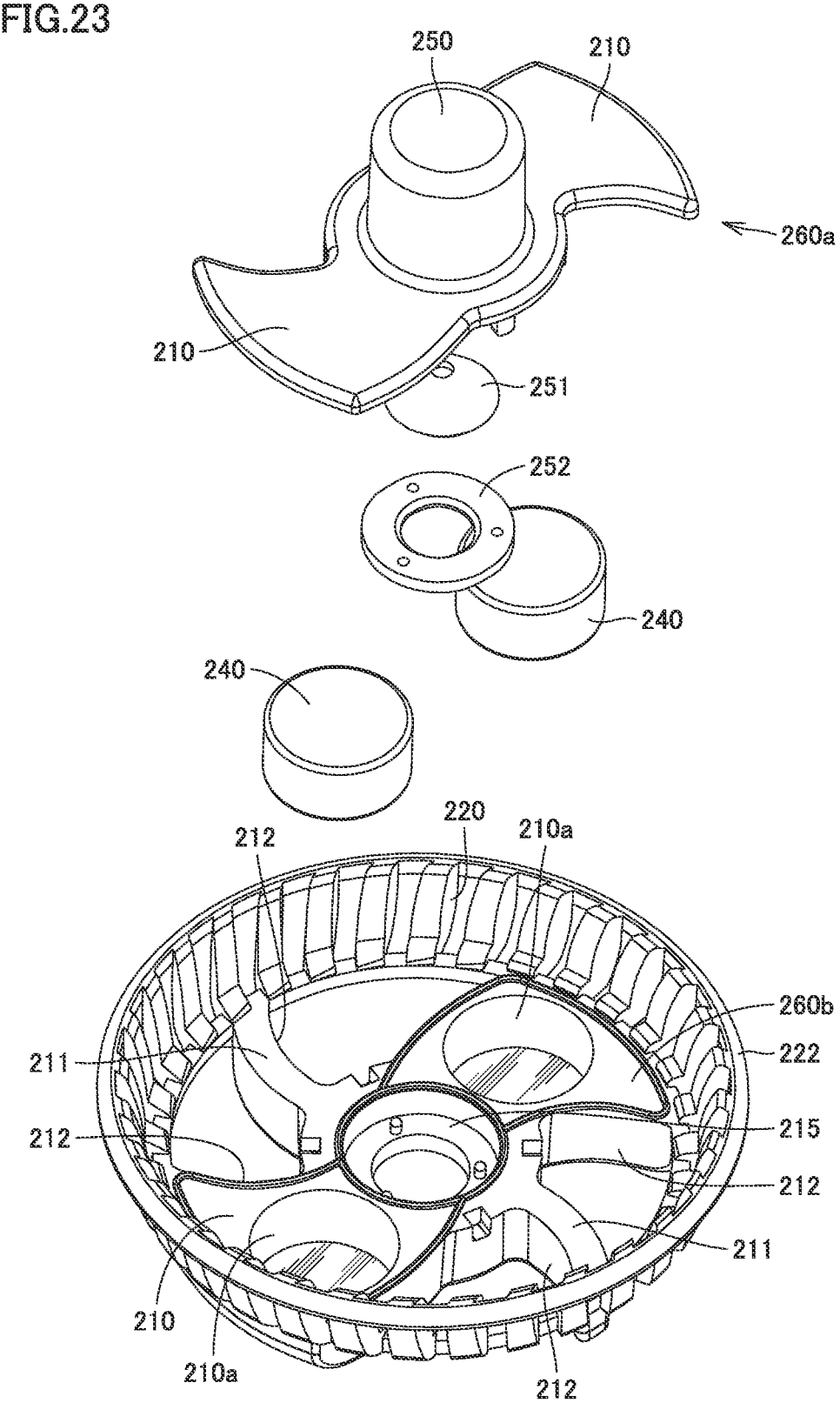
FIG. 23 is an exploded perspective view showing a structure of the agitation blade in Embodiment 12.
Figure 24:
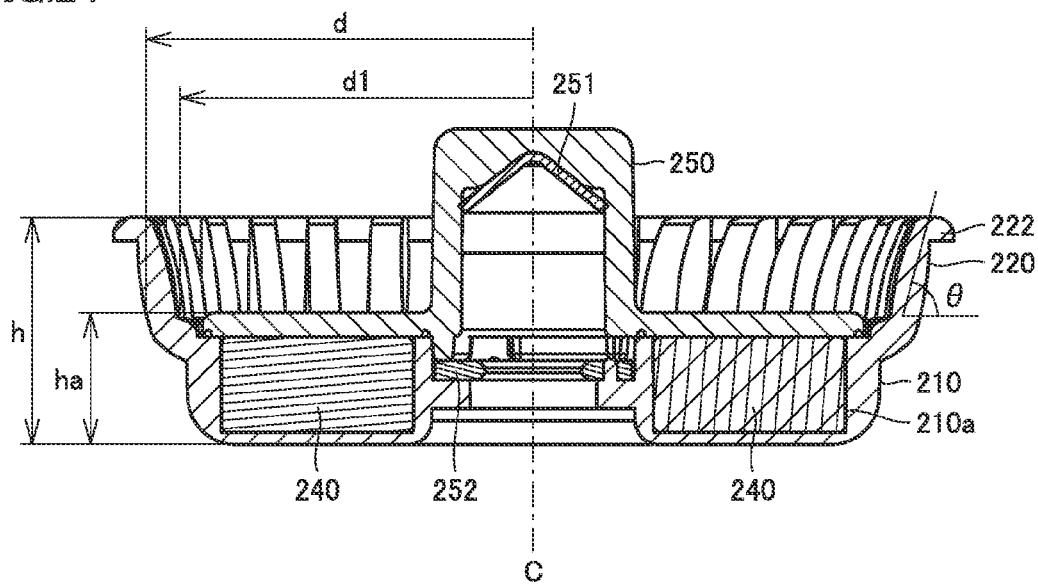
FIG. 24 is a cross-sectional view along the line XXIV-XXIV in FIG. 21.

A shape of an agitation blade 2D in the present embodiment will now be described with reference to FIGS. 21 to 24. FIG. 21 is a plan view showing a shape of agitation blade 2D, FIG. 22 is a perspective view showing the shape of agitation blade 2D, FIG. 23 is an exploded perspective view showing a structure of agitation blade 2D, and FIG. 24 is a cross-sectional view along the line XXIV-XXIV in FIG. 21.

Figure 22:
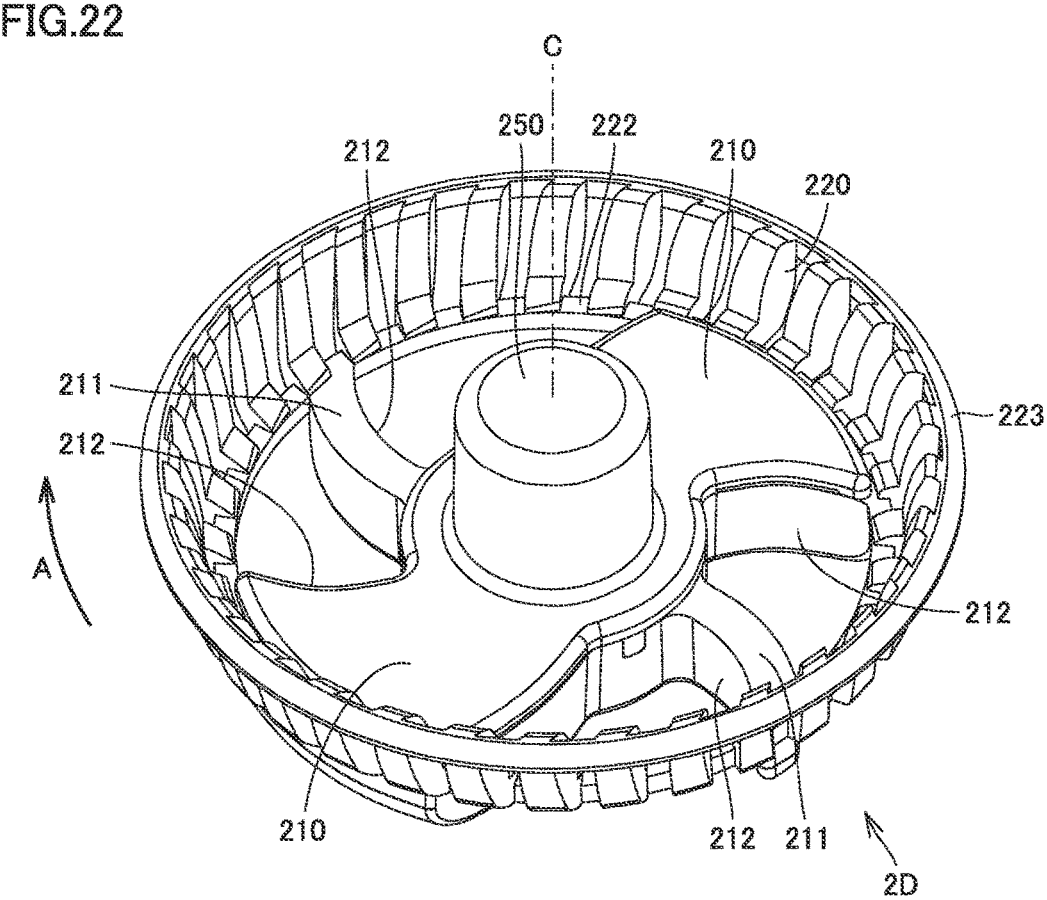
FIG. 22 is a perspective view showing the shape of the agitation blade in Embodiment 12.

Referring to FIGS. 21 and 22, agitation blade 2D includes in the center, cylindrical core 250 in which a rotation shaft is inserted. Cylindrical core 250 implements a rotation portion having the central axis of rotation (C). A pair of first paddles 210 provided at positions opposed to each other at an angle of 180 degrees and a pair of second paddles 211 provided at positions opposed to each other at an angle of 180 degrees, each at a position rotated by 90 degrees from first paddle 210, extend radially from an outer circumferential surface of cylindrical core 250.

A lower auxiliary ring 222 is provided on an outer circumferential surface of the pair of first paddles 210 and an outer circumferential surface of the pair of second paddles 211. Lower auxiliary ring 222 has such a shape as not producing a resistance in a direction of rotation (a direction shown with an arrow A in the figures). A plurality of blade portions 220 extending toward an upper surface (a first surface) of first paddle 210 and second paddle 211 are provided on lower auxiliary ring 222 so as to surround central axis of rotation C and to be in rotation symmetry with respect to central axis of rotation C. An upper end portion of blade portion 220 is coupled to an upper auxiliary ring 223. Upper auxiliary ring 223 also has a shape not producing a resistance in the direction of rotation, similarly to lower auxiliary ring 222. A detailed shape of blade portion 220 will be described later.

The pair of first paddles 210 has a curved paddle surface 212, which has a prescribed thickness downward (toward a second surface), has a curved shape recessed opposite to the direction of rotation, and contributes to agitation in the direction of rotation (the direction shown with arrow A in the figures). Similarly, second paddle 211 has curved paddle surface 212 formed, which has a prescribed thickness downward (toward the second surface), has a curved shape recessed opposite to the direction of rotation, and contributes to agitation in the direction of rotation (the direction shown with arrow A in the figures). Paddle surfaces 212 are provided at four locations, and four spaces 210h in total are formed between first paddles 210 and second paddles 211. A permanent magnet 240 which will be described later is embedded in the pair of first paddles 210.

Referring to FIGS. 23 and 24, cylindrical core 250 and the pair of first paddles 210 include an integrally formed cover 260a. A cylindrical accommodation portion 210a for accommodating permanent magnet 240 is provided in a paddle main body 260b of first paddle 210. Rotation is transmitted to permanent magnet (a magnet on a side of the blade) 240 embedded in the pair of first paddles 210, by a contactless rotational drive mechanism which will be described later, by means of magnetic force.

In order to enhance holding capability owing to magnetic force during rotational drive, the permanent magnet is desirably provided at two locations with cylindrical core 250 lying therebetween. As will be described later, when blade portion 220 has an outer diameter (d) of φ 32 mm, a pitch between magnets between which cylindrical core 250 lies is limited. For example, when magnets the same in magnetic force are provided at three or more locations, interference of magnetic force occurs between adjacent magnets and a magnet may fall off during rotational drive. By providing permanent magnets at two locations as described above, a distance between magnets on a circumference of rotation can be increased and interference of magnetic force between adjacent magnets can be avoided.

A through hole 215 in which the rotation shaft is inserted is provided between the pair of first paddles 210. A conical cap 251 is accommodated in cylindrical core 250 for smooth rotation of agitation blade 2D with a tip end of the rotation shaft being in point contact. A ring seal 252 for ensuring water tightness is fitted in between cover 260a and paddle main body 260b.

A shape of blade portion 220 will now be described with reference to FIG. 24. An angle of inclination θ spreading outward in an upward direction is provided in blade portion 220. Angle of inclination θ is set, for example, to approximately 75 degrees. Depending on angle of inclination θ, agitation blade 2D can obtain high agitation force with an outer shape being the same, or load imposed on the rotational drive portion can be lowered with agitation force being the same. A shape shown in FIGS. 3, 6, 7, and 8 can be adopted for a horizontal cross-sectional shape of blade portion 220.

Depending on angle of inclination θ, ease in cleaning of agitation blade 2D improves. An area where height ha of first paddle 210 and second paddle 211 produces a resistance (contributes to agitation force) in the direction of rotation as shown in FIG. 24 with respect to total height h of agitation blade 2D is defined. In the present embodiment, desirably, h=9.5 mm and ha=5.5 mm. Blade portion 220 desirably has an inner diameter d1=φ30 mm and an outer diameter d=φ32 mm.

Thus, an effect of foaming by intake of air from a water surface described with reference to FIGS. 4 and 5 and an effect of agitation by paddle surfaces 212 of first paddle 210 and second paddle 211 can both be achieved. In order to realize the effect of foaming, a distance between the water surface and the upper end of the blade should be ensured, and in order to decrease a minimal volume of foaming, total height h should be minimized. On the other hand, height ha of paddle surface 212 should be ensured in order to ensure agitation force, and the construction as above is preferred in order to achieve both of them. According to the construction of the present embodiment, foaming and agitation performance for a minimum volume of 150 cc has been confirmed in the agitation tank having inner diameter ϕ of 100 mm.

(Modification: Agitation Blade 2D')

Figure 25:
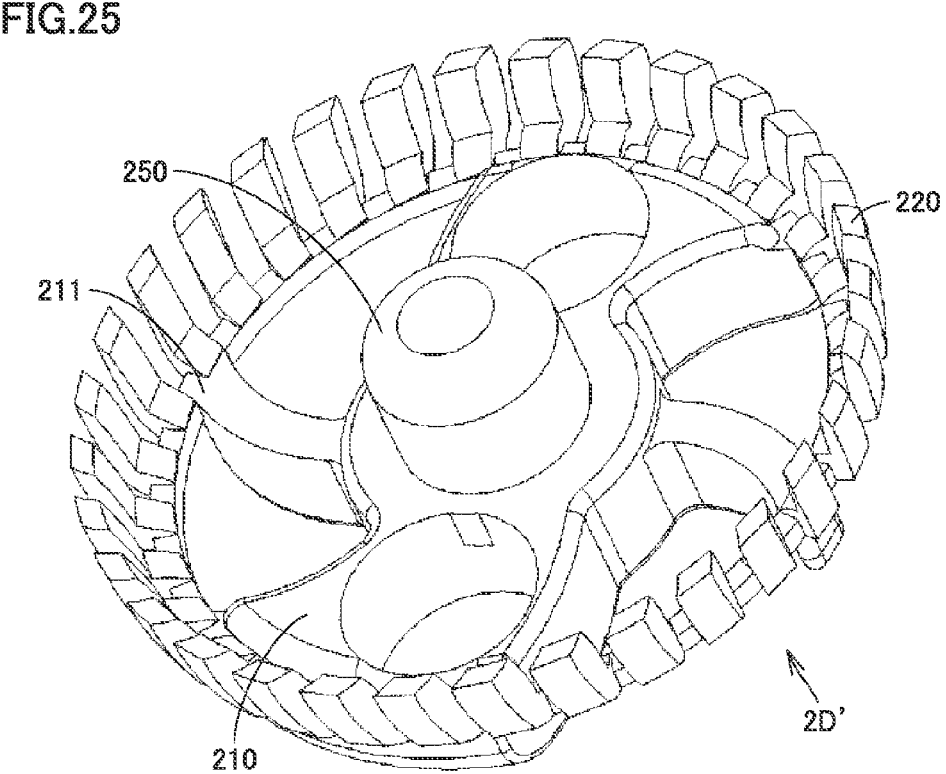
FIG. 25 is a diagram showing a structure of an agitation blade in a modification of Embodiment 12.

FIG. 25 shows an agitation blade 2D' as a modification of agitation blade 2D in Embodiment 12. This agitation blade 2D' is not provided with upper auxiliary ring 223 as compared with agitation blade 2D. In this case, since the tip end of blade portion 220 may be damaged by impact during rotation or cleaning, a material having strength to some extent such as a resin or a metal is desirably employed for blade portion 220. Alternatively, a flexible material such as a hair-implanted brush may be employed. When a flexible material is employed for blade portion 220, impact is mitigated and there is no possibility of damage.

In the present embodiment, at least blade portion 220 serves as a first agitation portion and paddle surface 212 serves as a second agitation portion, which is also the case in embodiments below.

Embodiment 13: Agitation Blade 2E

Figure 26:
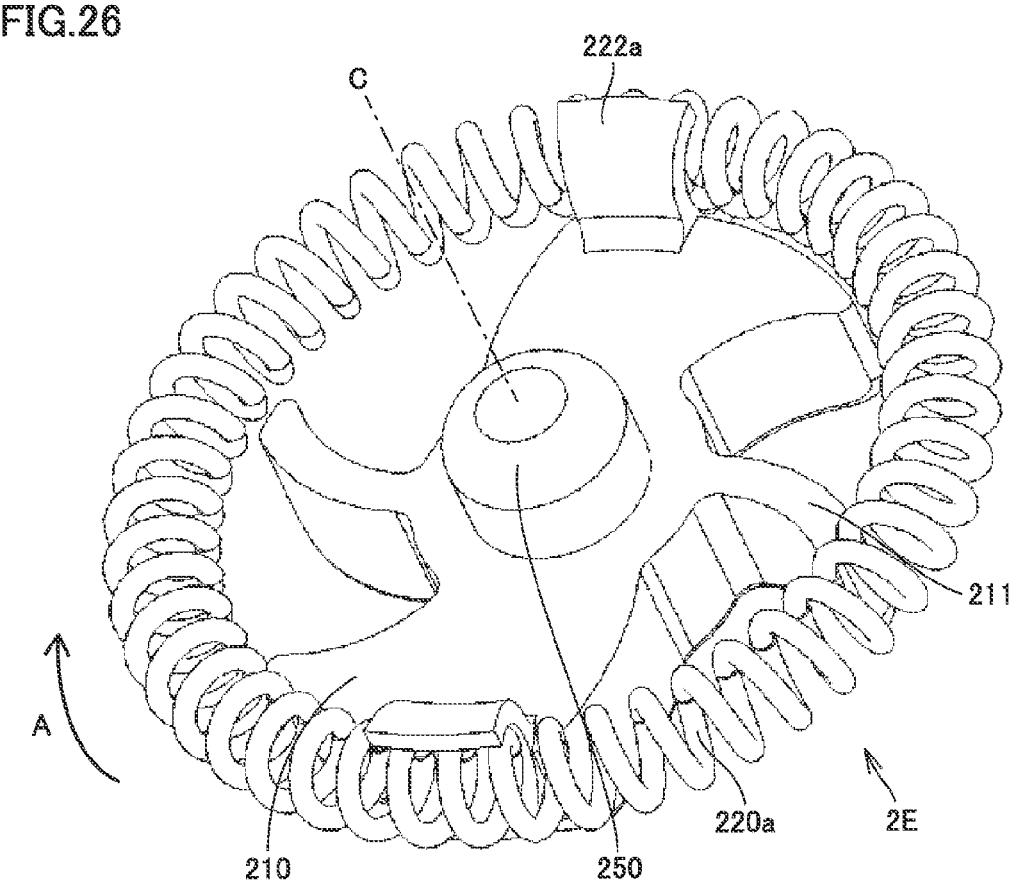
FIG. 26 is a perspective view showing a shape of an agitation blade in Embodiment 13.
Figure 27:
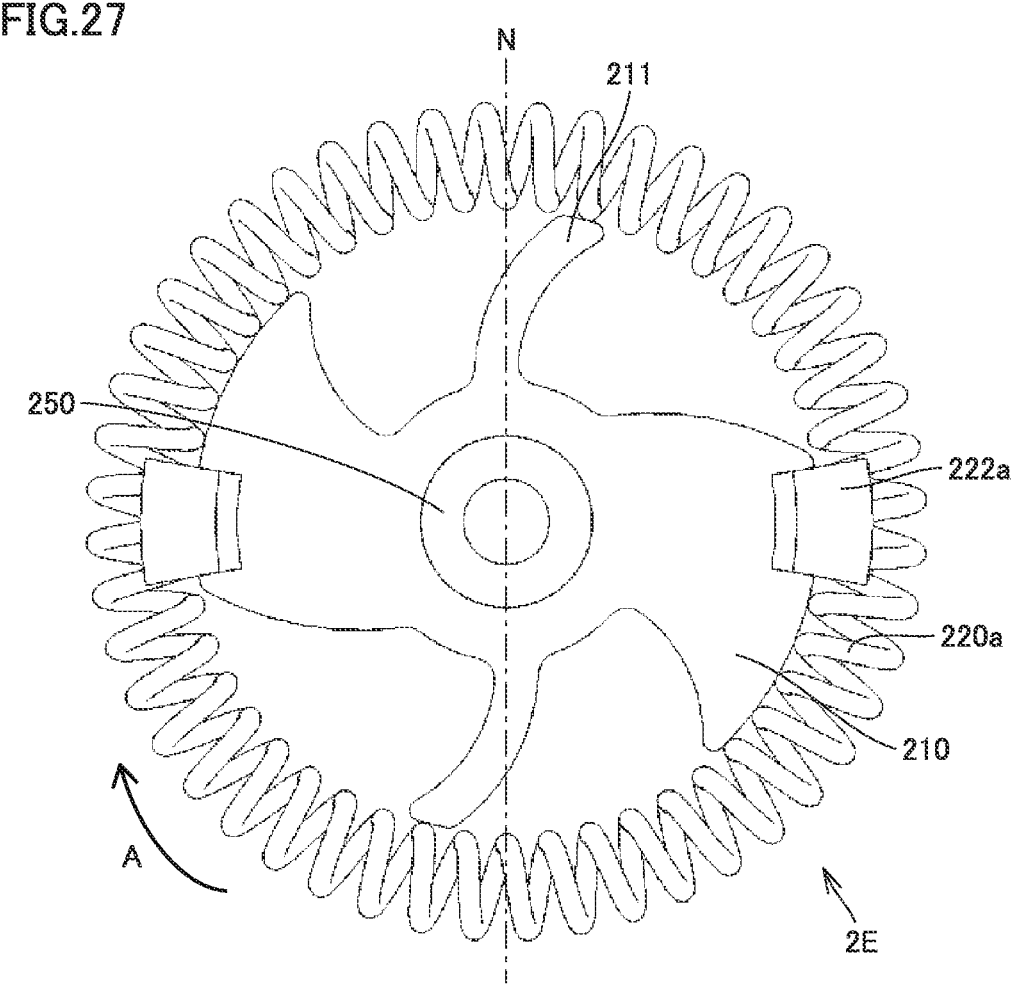
FIG. 27 is a plan view showing the shape of the agitation blade in Embodiment 13.
Figure 28:
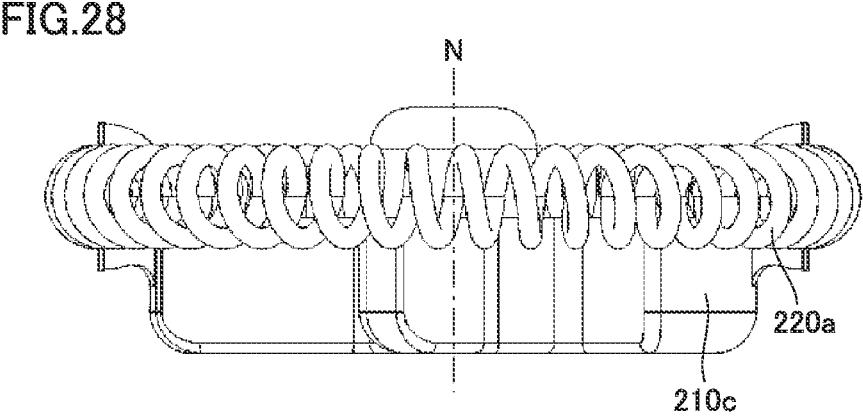
FIG. 28 is a side view showing the shape of the agitation blade in Embodiment 13.

A shape of an agitation blade 2E in the present embodiment will now be described with reference to FIGS. 26 to 28. FIG. 26 is a perspective view showing a shape of agitation blade 2E, FIG. 27 is a plan view showing the shape of agitation blade 2E, and FIG. 28 is a side view of agitation blade 2E. The description common to Embodiment 12 is not provided and the same reference character is allotted. N in FIGS. 27 and 28 represents a centerline.

Referring to FIGS. 26 to 28, agitation blade 2E includes in the center, cylindrical core 250 in which the rotation shaft in inserted. Cylindrical core 250 implements the rotation portion having the central axis of rotation (C). A pair of first paddles 210 provided at positions opposed to each other at an angle of 180 degrees and a pair of second paddles 211 provided at positions opposed to each other at an angle of 180 degrees, each at a position rotated by 90 degrees from first paddle 210, radially extend from the outer circumferential surface of cylindrical core 250.

A holding portion 222a is provided in an outer circumferential upper portion of the pair of first paddles 210. Holding portion 222a has a shape not producing a resistance in the direction of rotation (the direction shown with arrow A in the figures). Holding portion 222a supports a part of a toroidal coil 220a arranged on a side of the upper surface (first surface) of first paddle 210 and second paddle 211 and fixes first paddle 210. Toroidal coil 220a is arranged to surround the central axis of rotation (C) and to be in rotation symmetry with respect to the central axis of rotation (C), and has a function the same as blade portion 220 in Embodiment 12 described above.

Toroidal coil 220a is desirably formed by coupling opposing ends of a spring member obtained by working a wire. Adjacent wires of toroidal coil 220a desirably have a gap therebetween. For example, stainless steel is desirable for a material for the wire.

Thus, by arranging toroidal coil 220a the same in function as blade portion 220 in the upper portion of the agitation blade and arranging first paddle 210 and second paddle 211 in the lower portion of the agitation blade, an effect of foaming by intake of air from a water surface and an effect of agitation by paddle surfaces 212 of first paddle 210 and second paddle 211 can both be achieved.

Embodiment 14: Agitation Blade 2F

Figure 29:
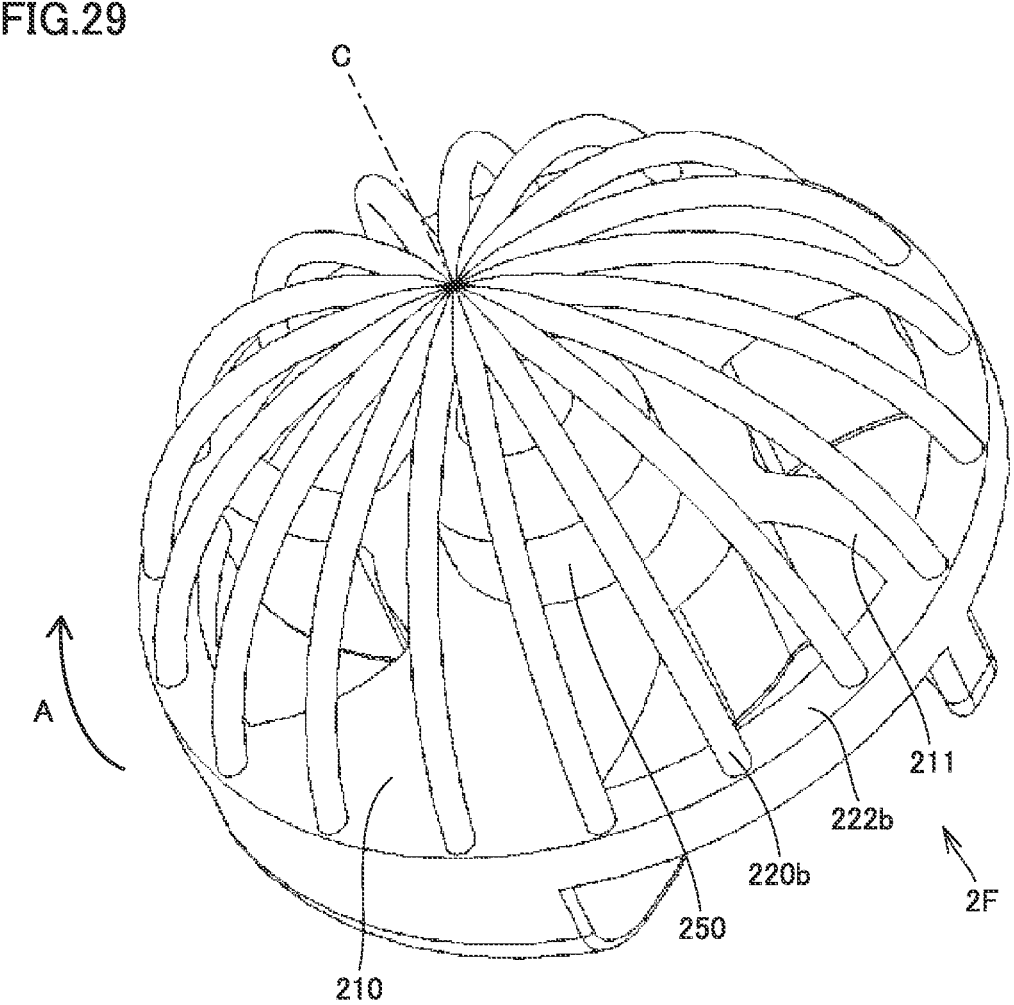
FIG. 29 is a perspective view showing a shape of an agitation blade in Embodiment 14.
Figure 30:
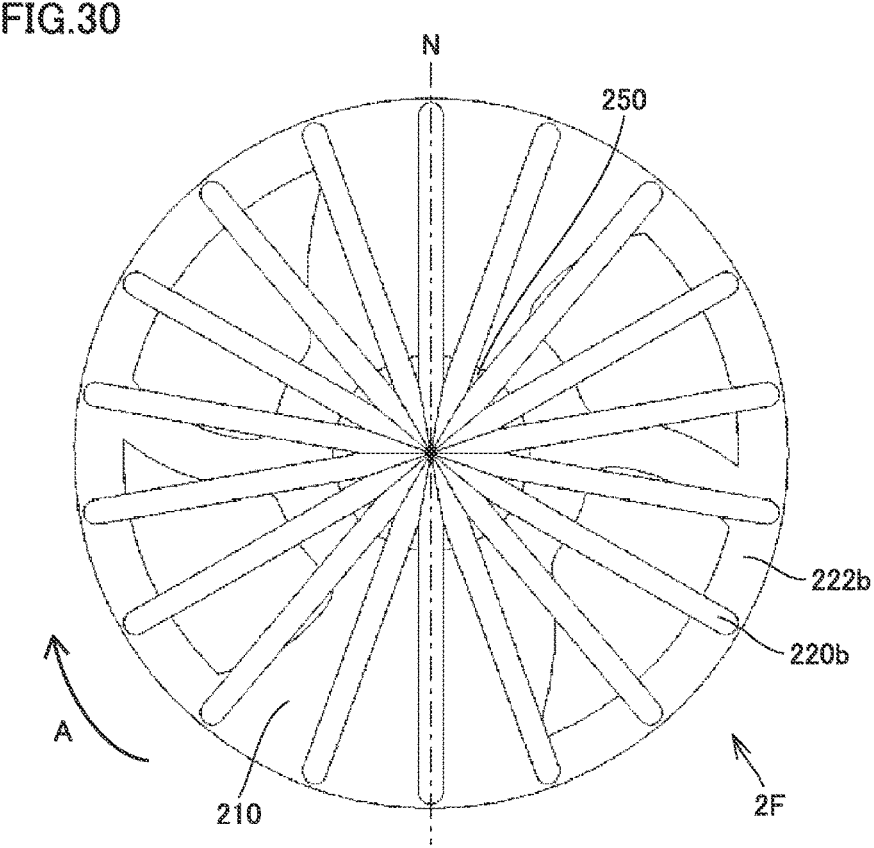
FIG. 30 is a plan view showing the shape of the agitation blade in Embodiment 14.
Figure 31:
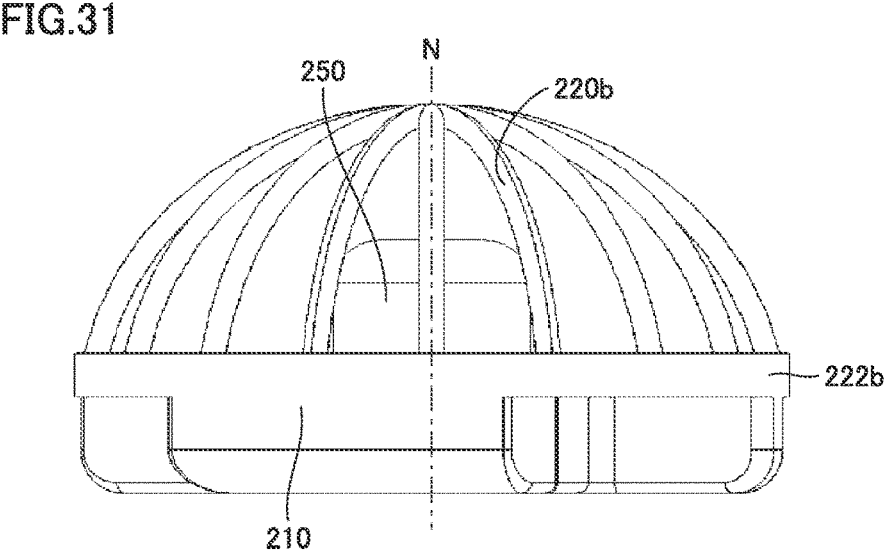
FIG. 31 is a side view showing the shape of the agitation blade in Embodiment 14.

A shape of an agitation blade 2F in the present embodiment will now be described with reference to FIGS. 29 to 31. FIG. 29 is a perspective view showing a shape of agitation blade 2F, FIG. 30 is a plan view showing the shape of agitation blade 2F, and FIG. 31 is a side view showing the shape of agitation blade 2F. The description common to Embodiment 12 is not provided and the same reference character is allotted. N in FIGS. 30 and 31 represents a centerline.

Referring to FIGS. 29 to 31, agitation blade 2F includes in the center, cylindrical core 250 in which the rotation shaft in inserted. Cylindrical core 250 implements the rotation portion having the central axis of rotation (C). A pair of first paddles 210 provided at positions opposed to each other at an angle of 180 degrees and a pair of second paddles 211 provided at positions opposed to each other at an angle of 180 degrees, each at a position rotated by 90 degrees from first paddle 210, radially extend from the outer circumferential surface of cylindrical core 250.

A lower auxiliary ring 222b is provided on the outer circumferential surface of the pair of first paddles 210 and the outer circumferential surface of the pair of second paddles 211. Lower auxiliary ring 222b has a shape not producing a resistance in the direction of rotation (the direction shown with arrow A in the figures). A plurality of curved blade portions 220b extending toward the upper surface (first surface) of first paddle 210 and second paddle 211 and arranged such that end points thereof concentrate by curving at the central axis of rotation (C) are provided on lower auxiliary ring 222b so as to surround the central axis of rotation (C) and to be in rotation symmetry with respect to central axis of rotation C, and form a shape like a dome.

By thus forming a shape like a dome with the use of the plurality of blade portions 220b, in addition to the effect in Embodiment 12, there is no protruding blade portion and handling is facilitated.

Embodiment 15: Agitation Blade 2G

Figure 32:
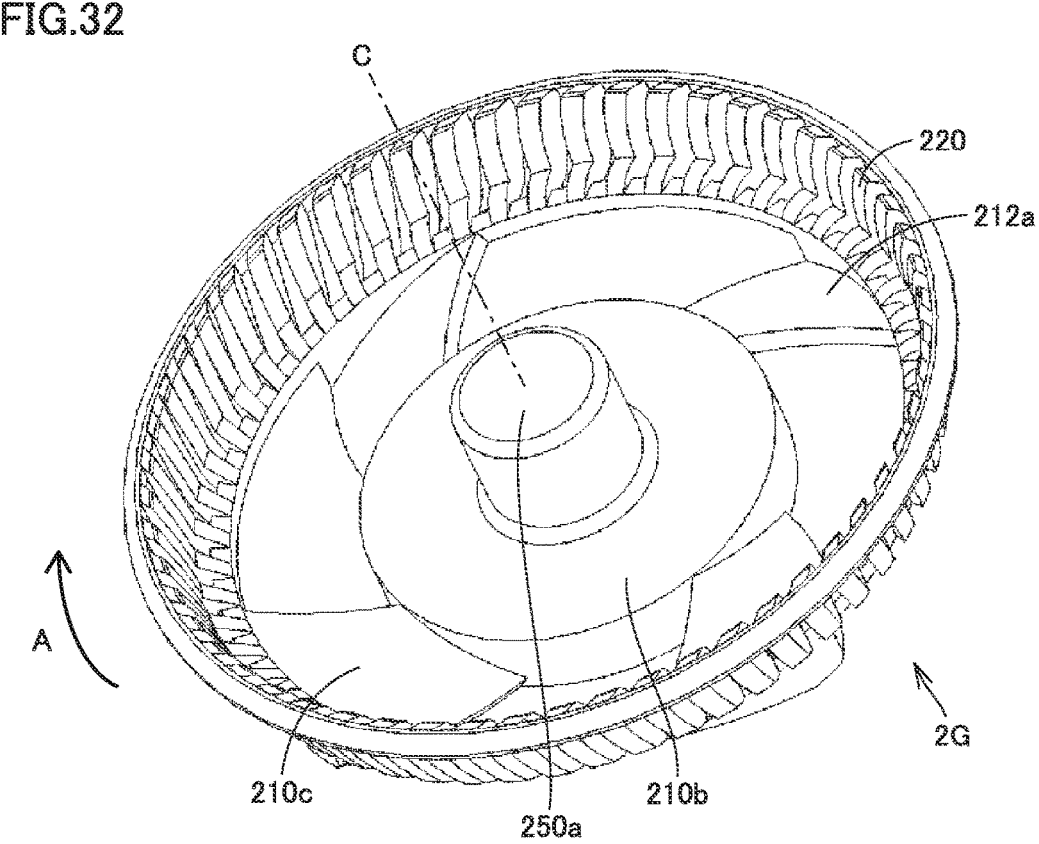
FIG. 32 is a perspective view showing a shape of an agitation blade in Embodiment 15.
Figure 33:
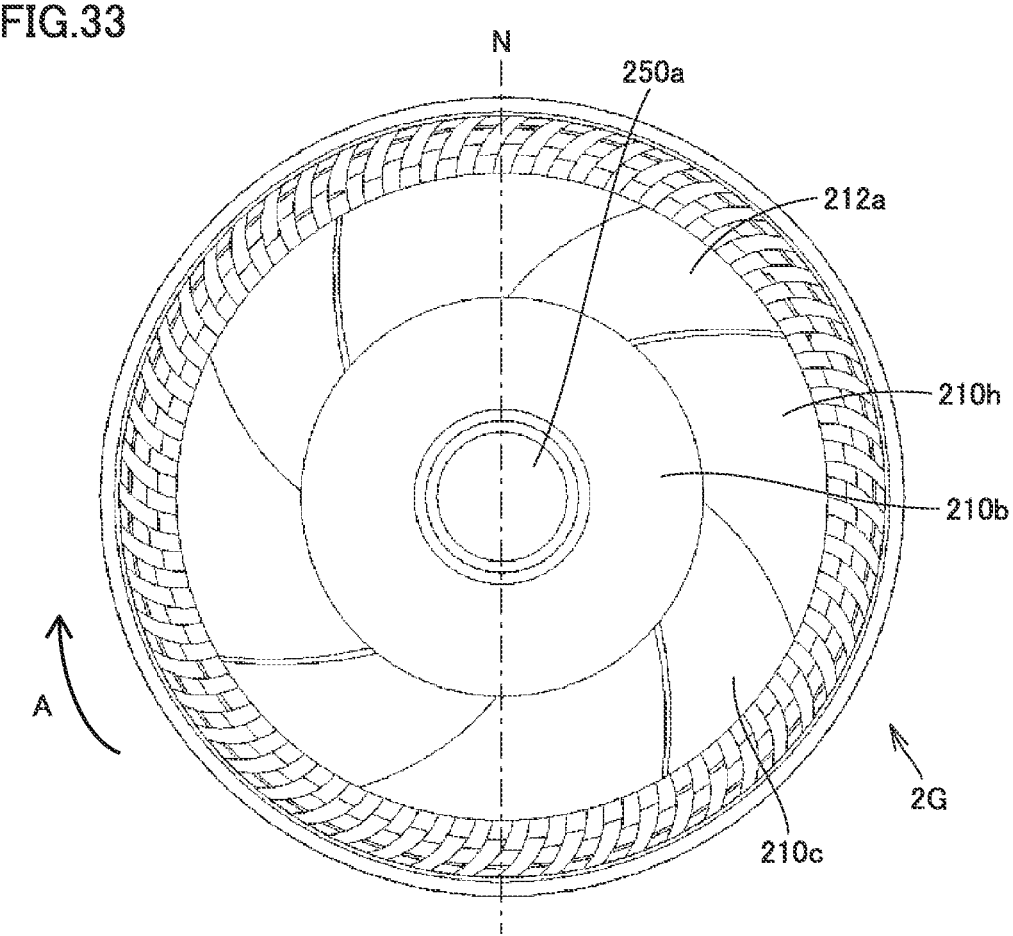
FIG. 33 is a plan view showing the shape of the agitation blade in Embodiment 15.
Figure 34:
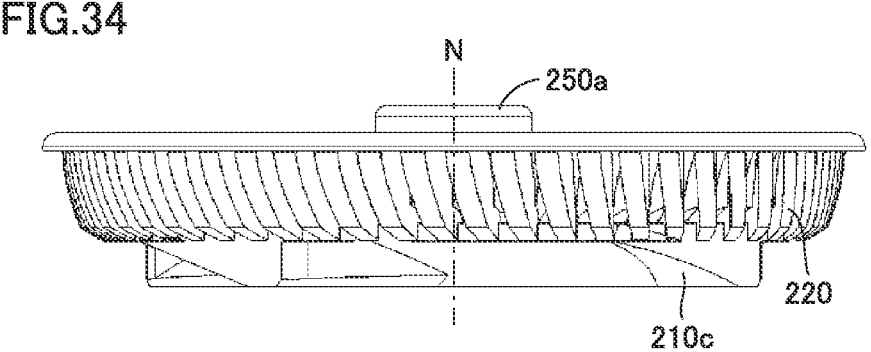
FIG. 34 is a side view showing the shape of the agitation blade in Embodiment 15.

A shape of an agitation blade 2G in the present embodiment will now be described with reference to FIGS. 32 to 34. FIG. 32 is a perspective view showing a shape of agitation blade 2G, FIG. 33 is a plan view showing the shape of agitation blade 2G, and FIG. 34 is a side view showing the shape of agitation blade 2G. The description common to Embodiment 12 is not provided and the same reference character is allotted. N in FIGS. 33 and 34 represents a centerline.

Referring to FIGS. 32 to 34, agitation blade 2G includes in the center, a cylindrical core 250a in which the rotation shaft is inserted. Cylindrical core 250a implements the rotation portion having the central axis of rotation (C). A disk-shaped boss portion 210b is provided on an outer circumferential surface of cylindrical core 250a, and a paddle 210c radially extending from an outer circumferential surface of boss portion 210b is provided at four locations in total at every 90-degree position.

Permanent magnet 240 described above is embedded in boss portion 210b and rotation is transmitted by a contactless rotational drive mechanism by means of magnetic force.

A paddle surface 212a having a prescribed thickness toward below (second surface) and contributing to agitation in the direction of rotation (the direction shown with arrow A in the figures) is formed in four paddles 210c. The paddle surface is arranged obliquely such that a rear side of paddle surface 212a is lower in the direction of rotation. Paddles 210c is provided at four locations and four spaces 210h in total are formed between paddles 210c.

By thus obliquely arranging the paddle surface such that the rear side of paddle surface 212a is lower in the direction of rotation of paddle 210c, an agitation flow of water can be produced as being concentrated in a direction laterally below agitation blade 2G and as dredging the bottom surface of agitation tank 1. Therefore, agitation force around the bottom surface of agitation tank 1 can be improved.

Embodiment 16: Agitation Blade 2H

Figure 35:
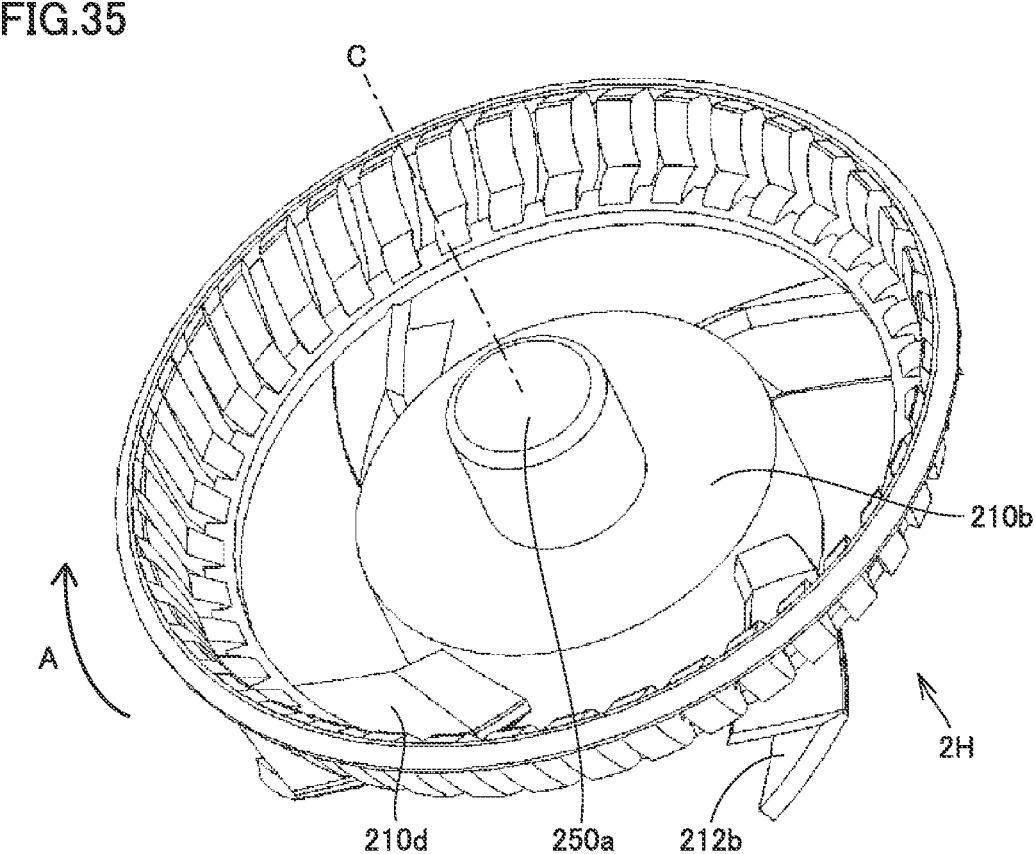
FIG. 35 is a perspective view showing a shape of an agitation blade in Embodiment 16.
Figure 36:
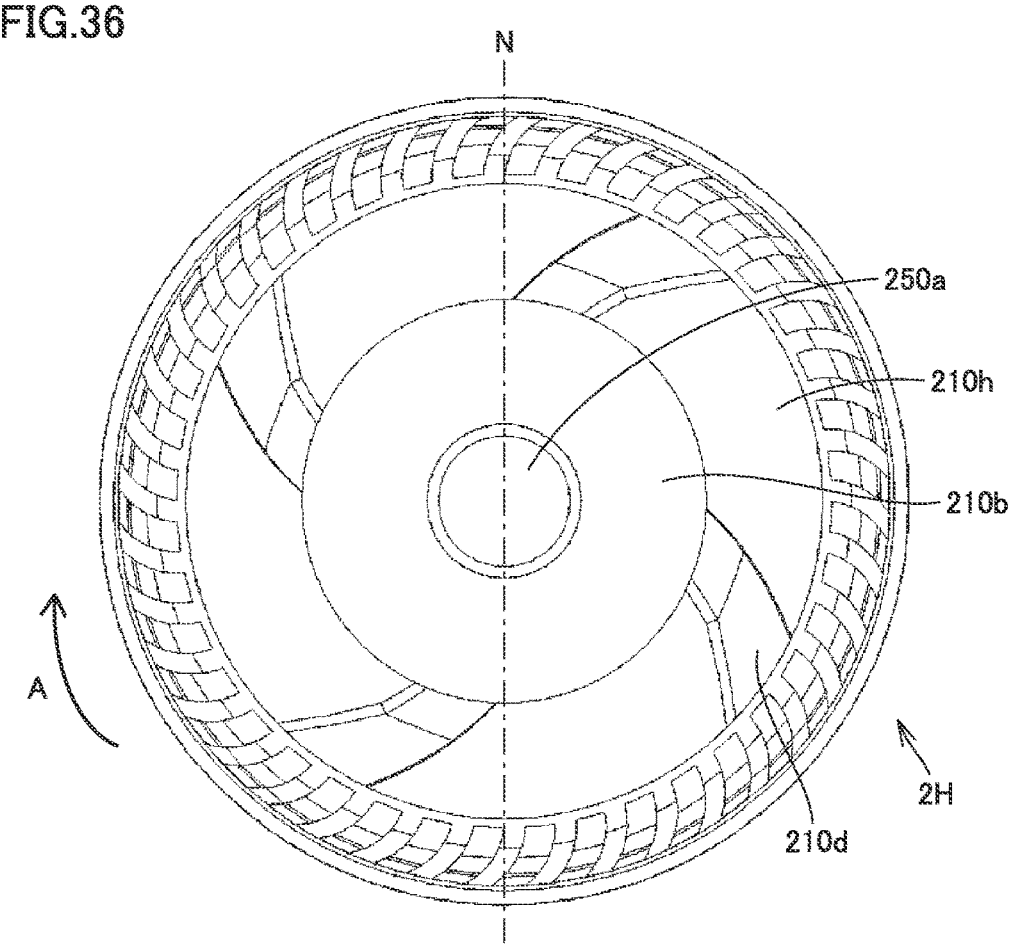
FIG. 36 is a plan view showing the shape of the agitation blade in Embodiment 16.
Figure 37:
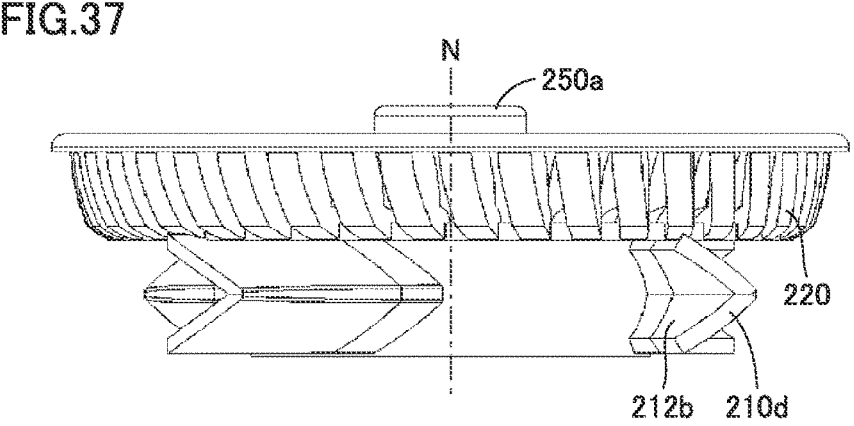
FIG. 37 is a side view showing the shape of the agitation blade in Embodiment 16.

A shape of an agitation blade 2H in the present embodiment will now be described with reference to FIGS. 35 to 37. FIG. 35 is a perspective view showing a shape of agitation blade 2H, FIG. 36 is a plan view showing the shape of agitation blade 2H, and FIG. 37 is a side view showing the shape of agitation blade 2H. The description common to Embodiment 12 is not provided and the same reference character is allotted. N in FIGS. 36 and 37 represents a centerline.

A paddle surface 212b having a prescribed thickness toward below (second surface) and a shape recessed in a V shape on a side opposite to the direction of rotation and contributing to agitation in the direction of rotation (the direction shown with arrow A in the figures) is formed in four paddles 210d.

By thus arranging in paddle 210d, paddle surface 212b having the shape recessed in the V shape on the side opposite to the direction of rotation, an agitation flow of water can be produced as being concentrated lateral to agitation blade 2F. Therefore, agitation force around the bottom surface of agitation tank 1 can be improved.

Furthermore, in a case of rotation reverse to a direction of rotation A, load imposed on paddle 210d by a water flow can be lowered and thus agitation force can be selected.

Embodiment 17: Beverage Preparation Apparatus 1 and Milling Unit 300

Figure 38:
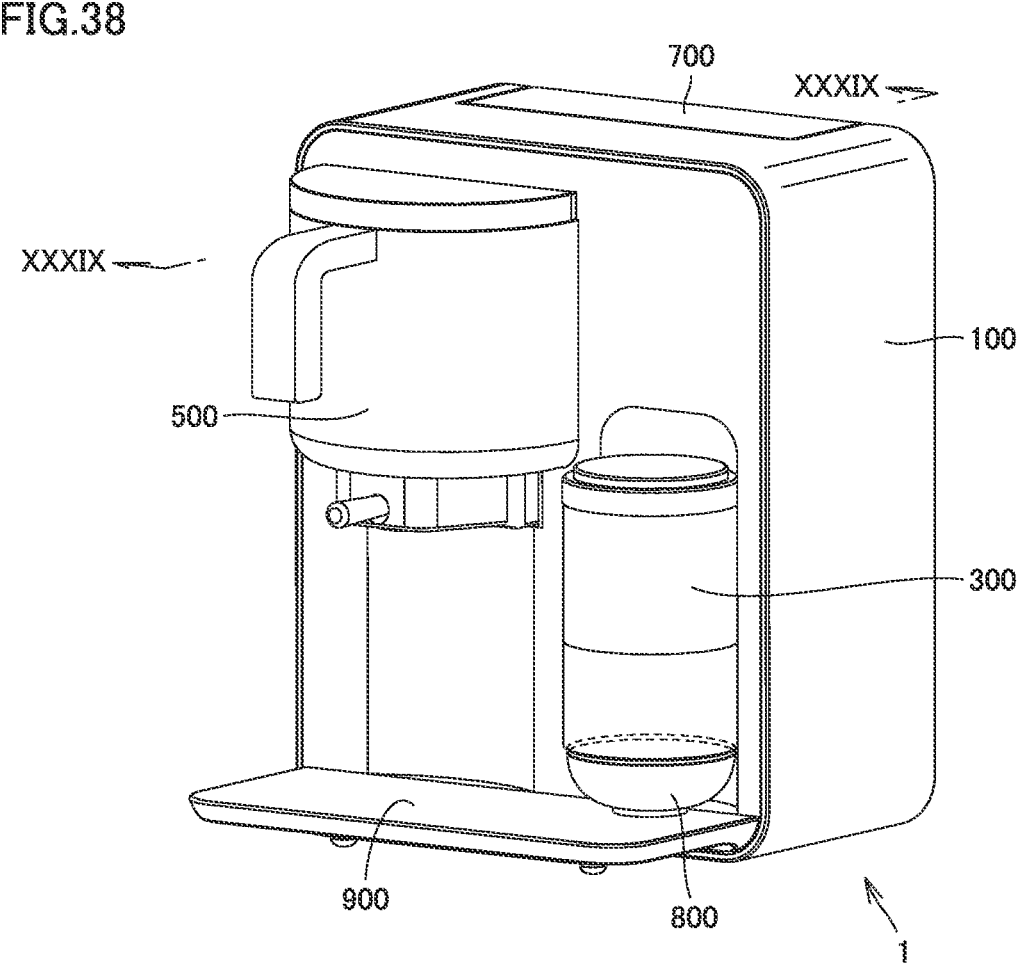
FIG. 38 is an overall perspective view of a beverage preparation apparatus in an embodiment.
Figure 39:
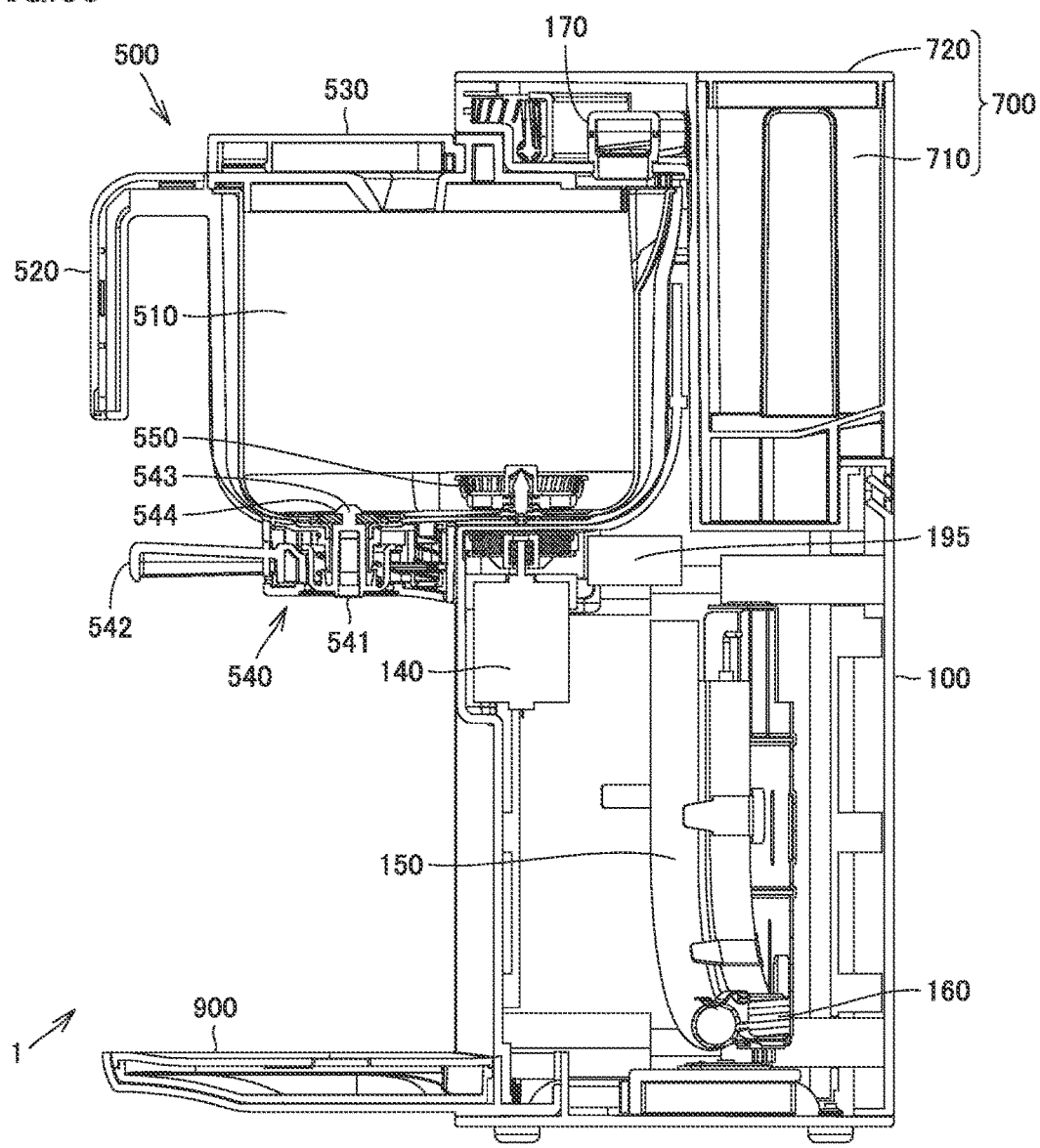
FIG. 39 is a cross-sectional view along the line XXXIX-XXXIX in FIG. 38.

A milling unit 300 including agitation blade 2D and a beverage preparation apparatus 1 including milling unit 300 will now be described below with reference to FIGS. 38 to 40. FIG. 38 is an overall perspective view of beverage preparation apparatus 1, FIG. 39 is a cross-sectional view along the line XXXIX-XXXIX in FIG. 38, and FIG. 40 is an overall perspective view showing a schematic component of beverage preparation apparatus 1.

Referring to FIG. 38, beverage preparation apparatus 1 uses tea leaves as an object to be grated and obtains tea leaf powders by grating these tea leaves. Tea as a drink is prepared by using these obtained tea leaf powders. Beverage preparation apparatus 1 includes an apparatus main body 100, milling unit 300 as a grater, an agitation unit 500, a water tank 700, a tea leaf powder tray 800, and a placement base 900. Placement base 900 is provided to protrude forward on a front side in a lower portion of apparatus main body 100 and a cup (not shown) and tea leaf powder tray 800 can be placed thereon.

(Milling Unit 300)

Figure 40:
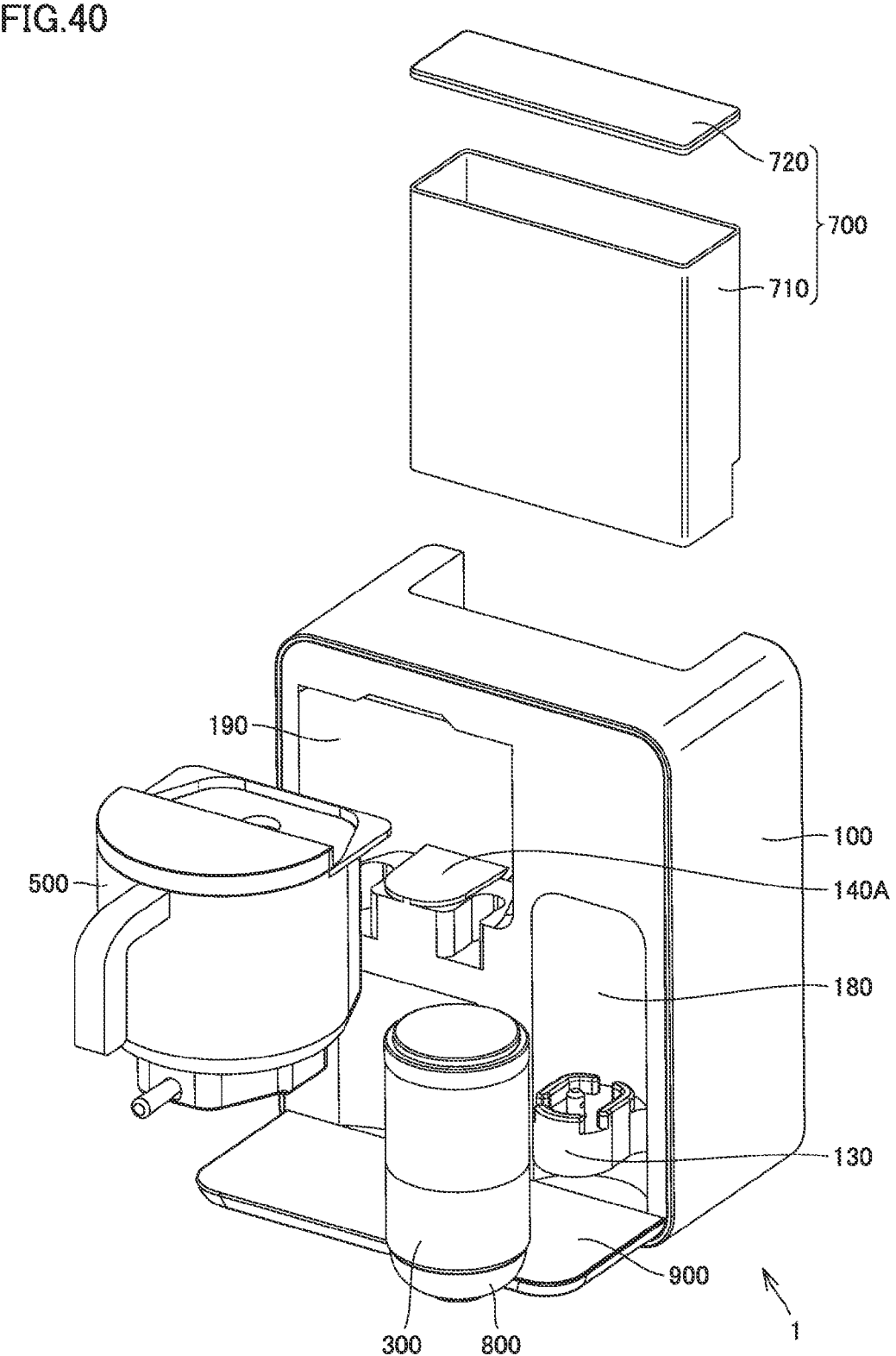
FIG. 40 is an overall perspective view showing a schematic component of a beverage preparation apparatus in Embodiment 17.

Referring to FIG. 40, milling unit 300 as a grating apparatus is removably attached to a milling unit attachment region 180 provided on the front surface side of apparatus main body 100. A milling driving force coupling mechanism 130 is provided in milling unit attachment region 180 so as to protrude forward and milling unit 300 is removably attached to this milling driving force coupling mechanism 130. Milling unit 300 obtains driving force for milling tea leaves representing an object to be grated by being coupled to milling driving force coupling mechanism 130.

Tea leaves introduced from an upper portion of milling unit 300 into milling unit 300 are finely grated in milling unit 300, and dropped and collected as tea leaf powders on tea leaf powder tray 800 placed below milling unit 300. A detailed structure of milling unit 300 will be described later with reference to FIGS. 45 to 47.

(Agitation Unit 500)

Referring to FIGS. 39 and 40, agitation unit 500 is removably attached to an agitation unit attachment region 190 provided on the front surface side of apparatus main body 100. An agitation motor contactless table 140A is provided in agitation unit attachment region 190 and rotationally drives with magnetic force, agitation blade 2D provided in agitation unit 500.

A hot water supply nozzle 170 is provided above agitation unit attachment region 190 of apparatus main body 100. In apparatus main body 100, a temperature of water in water tank 700 is raised to a prescribed temperature and hot water is supplied from hot water supply nozzle 170 into an agitation tank 510. Hot water prepared in apparatus main body 100 and tea leaf powders obtained by milling unit 300 are introduced into agitation tank 510, and hot water and tea leaf powders are agitated by an agitation blade 550 in agitation tank 510. Tea is thus prepared in agitation tank 510.

Japanese tea prepared in agitation unit 500 can be poured into a cup (not shown) placed on placement base 900 by operating an operation lever 542 of a discharge port opening and closing mechanism 540 provided below agitation unit 500. A detailed structure of milling unit 300 will be described later with reference to FIGS. 45 to 47.

(Flow of Preparation of Japanese Tea (Drinking Water))

Figure 41:
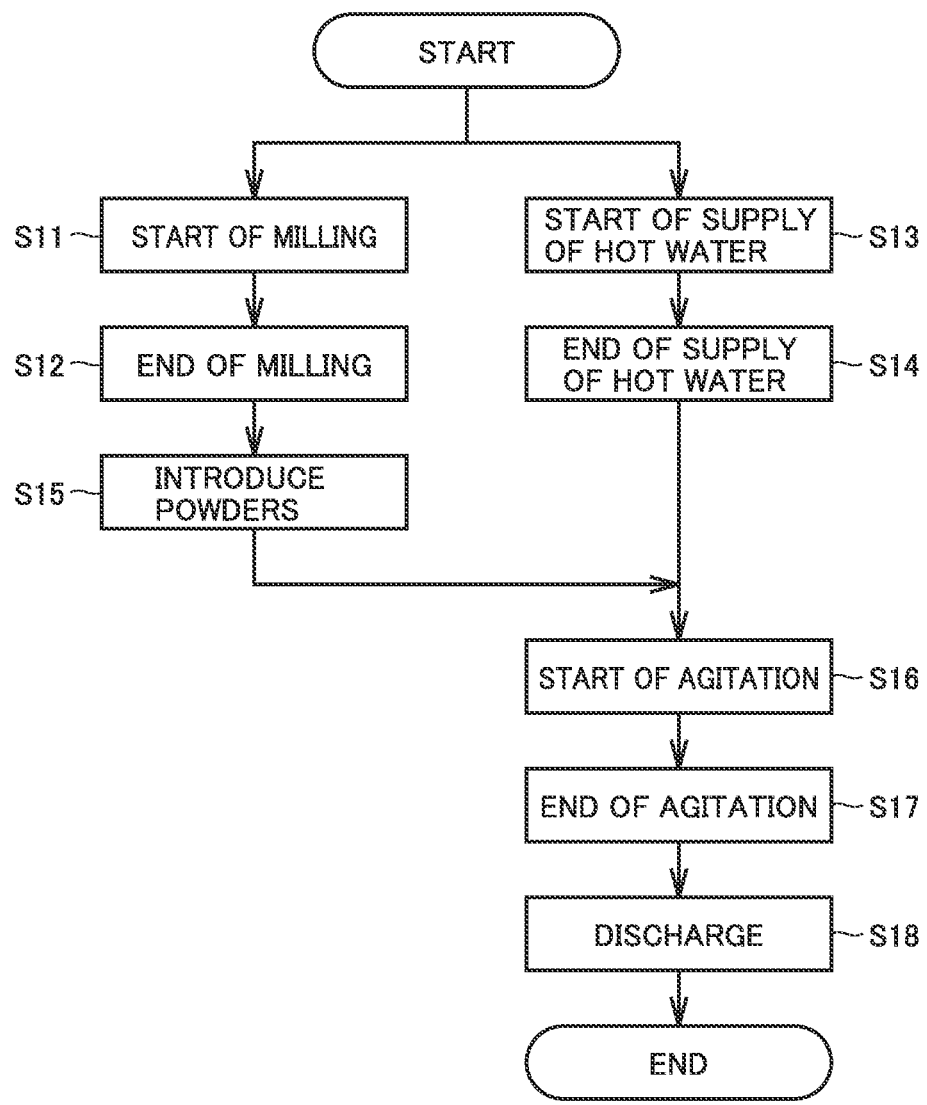
FIG. 41 shows a first preparation flow showing discharge of Japanese tea using the beverage preparation apparatus in Embodiment 17.
Figure 42:
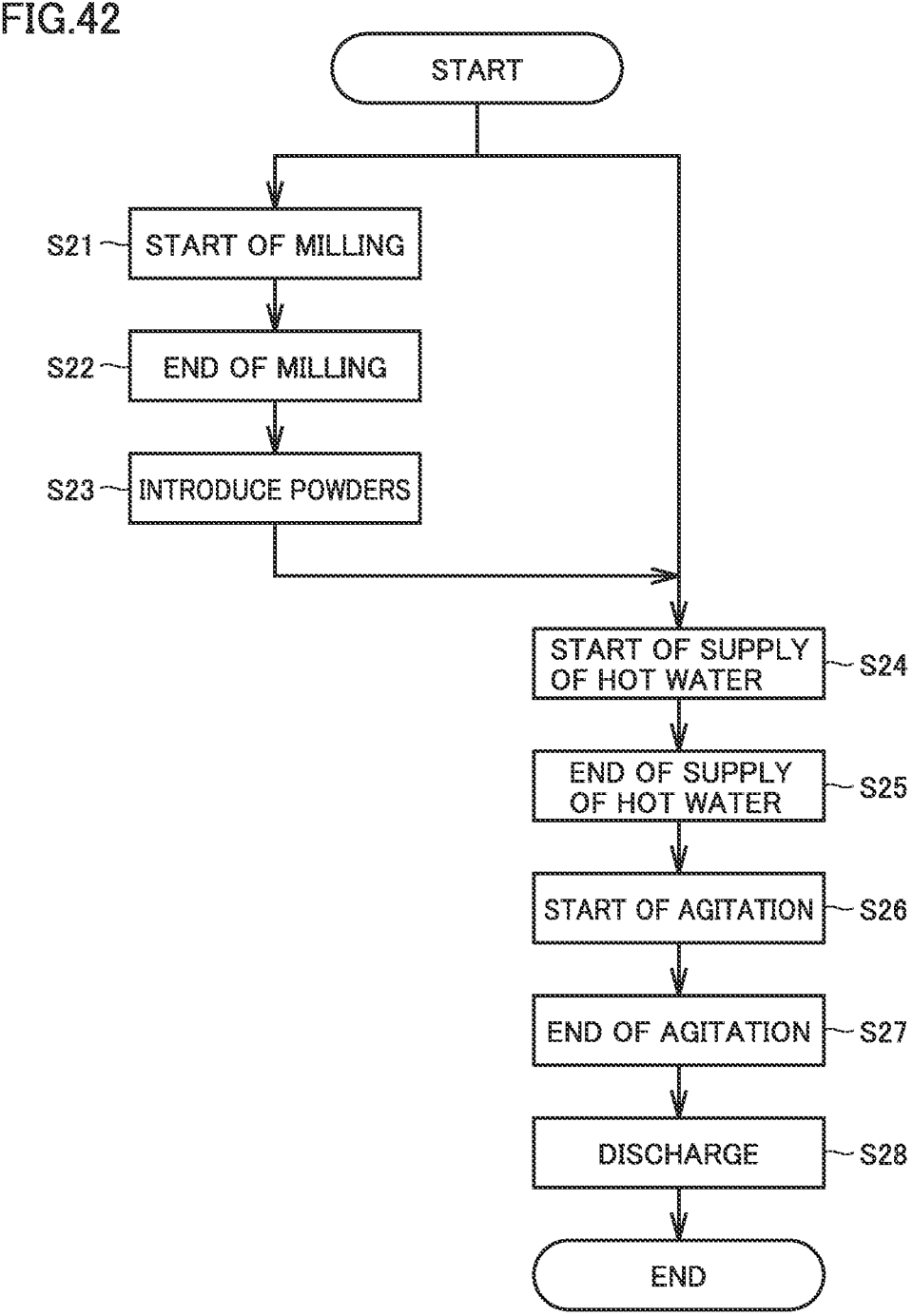
FIG. 42 shows a second preparation flow showing discharge of Japanese tea using the beverage preparation apparatus in Embodiment 17.
Figure 43:
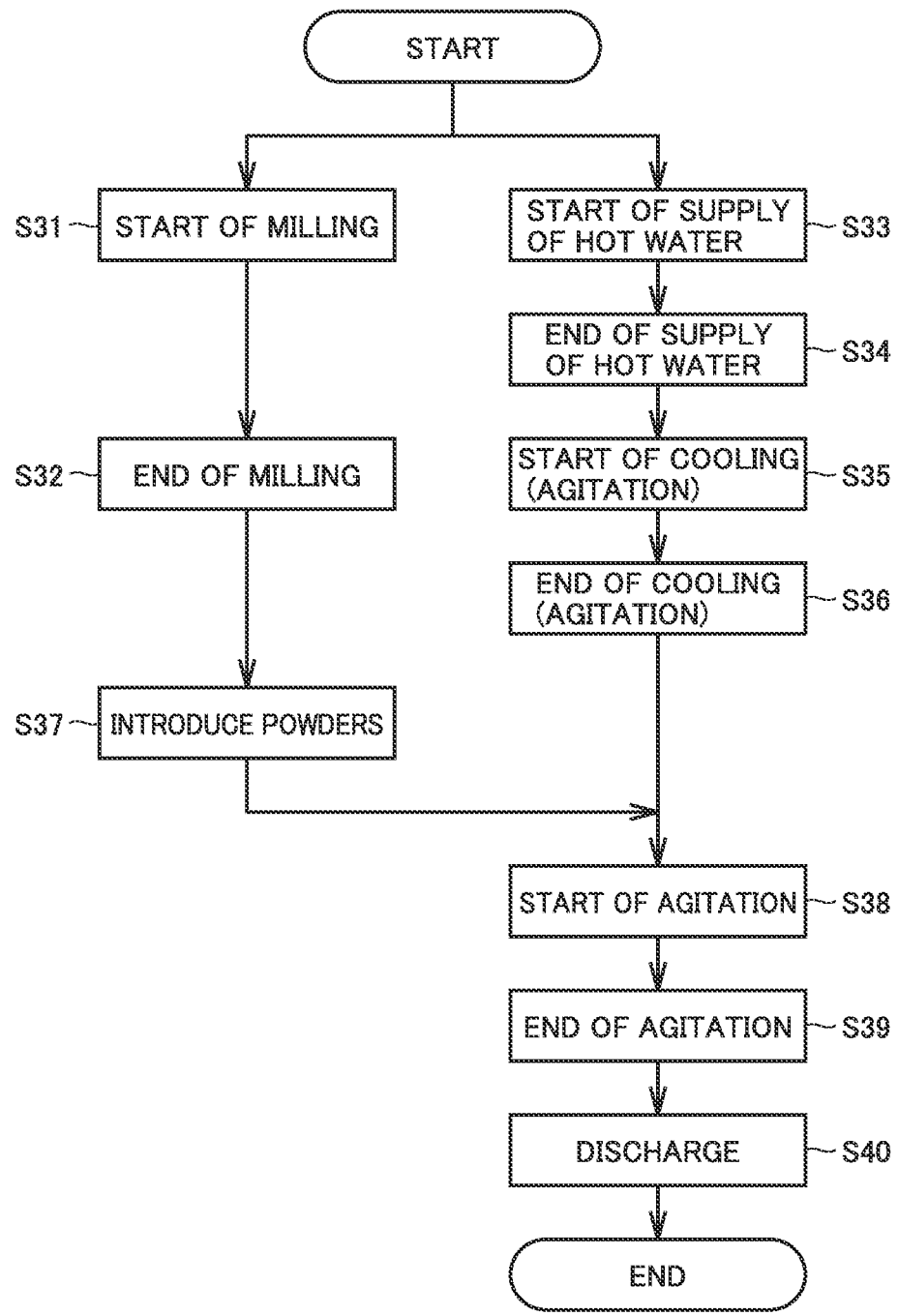
FIG. 43 shows a third preparation flow showing discharge of Japanese tea using the beverage preparation apparatus in Embodiment 17.

A flow of preparation of Japanese tea (drinking water) with the use of beverage preparation apparatus 1 will now be described with reference to FIGS. 41 to 43. FIGS. 41 to 43 show first to third preparation flows showing discharge of Japanese tea using beverage preparation apparatus 1, respectively. A prescribed amount of Japanese tea leaves is introduced into milling unit 300 and a prescribed amount of water is stored in water tank 700.

(First Preparation Flow)

A first preparation flow will be described with reference to FIG. 41. This first preparation flow is a flow in which grating of tea leaves in milling unit 300 and supply of hot water from apparatus main body 100 to agitation unit 500 are simultaneously carried out.

In beverage preparation apparatus 1, milling of tea leaves by milling unit 300 in a step 11 and supply of hot water from apparatus main body 100 to agitation unit 500 in a step 13 are simultaneously started. Then, milling of tea leaves by milling unit 300 ends in a step 12, and supply of hot water from apparatus main body 100 to agitation unit 500 ends in a step 14.

In a step 15, tea leaf powders obtained in step 12 are introduced into agitation unit 500 by a user.

Then, in a step 16, agitation of the tea leaf powders and hot water in agitation unit 500 is started. In a step 17, agitation of the tea leaf powders and hot water in agitation unit 500 ends. In a step 18, tea is discharged into the cup placed on placement base 900 as the user operates operation lever 542 of discharge port opening and closing mechanism 540 provided below agitation unit 500.

(Second Preparation Flow)

A second preparation flow will be described with reference to FIG. 42. This second preparation flow is a flow in which hot water is supplied from apparatus main body 100 to agitation unit 500 after tea leaves are grated in milling unit 300.

In beverage preparation apparatus 1, in a step 21, milling of tea leaves by milling unit 300 is started. In a step 22, milling of tea leaves by milling unit 300 ends. In a step 23, tea leaf powders obtained in step 22 are introduced into agitation unit 500 by a user.

In a step 24, supply of hot water from apparatus main body 100 to agitation unit 500 is started. In a step 25, supply of hot water from apparatus main body 100 to agitation unit 500 ends.

Then, in a step 26, agitation of the tea leaf powders and hot water in agitation unit 500 is started. In a step 27, agitation of the tea leaf powders and hot water in agitation unit 500 ends. In a step 28, tea is discharged into the cup placed on placement base 900 as the user operates operation lever 542 of discharge port opening and closing mechanism 540 provided below agitation unit 500.

(Third Preparation Flow)

A third preparation flow will be described with reference to FIG. 43. This third preparation flow includes a step of cooling hot water by agitation in agitation unit 500.

In beverage preparation apparatus 1, milling of tea leaves by milling unit 300 in a step 31 and supply of hot water from apparatus main body 100 to agitation unit 500 in a step 33 are simultaneously started. In a step 34, supply of hot water from apparatus main body 100 to agitation unit 500 ends.

Then, in a step 32, milling of tea leaves by milling unit 300 ends, and in a step 35, cooling by agitation of hot water supply is started in agitation unit 500. In a step 36, cooling by agitation of hot water supply in agitation unit 500 ends. In cooling by agitation of hot water supply, agitation blade 2D is rotated in a prescribed direction so that supplied hot water is stirred. Thus, hot water comes in contact with air (outside air is taken in from the water surface) and a temperature of the hot water is lowered to a desired temperature. The desired temperature means, for example, an optimal temperature for extracting components at a desired ratio in a case of tea leaf powders.

Though hot water is cooled by rotating agitation blade 2D in steps 35 and 36, limitation to this method is not intended. For example, a cooling portion 195 may separately be provided in beverage preparation apparatus 1 to cool agitation tank 510. Cooling portion 195 desirably carries out cooling, for example, by sending air with a fan or by water cooling.

After hot water is supplied into agitation tank 510, a cooling (heat radiation) step is inserted until a desired temperature is set and then powders T2 are introduced. Thus, a contained component can be extracted to hot water at a desired ratio.

In a step 37, the tea leaf powders obtained in step 32 are introduced into agitation unit 500 by a user.

Then, in a step 38, agitation of the tea leaf powders and hot water in agitation unit 500 is started. In a step 39, agitation of the tea leaf powders and hot water in agitation unit 500 ends. In a step 40, tea is discharged into the cup placed on placement base 900 as the user operates operation lever 542 of discharge port opening and closing mechanism 540 provided below agitation unit 500.

(Internal Structure of Apparatus Main Body 100)

Figure 44:
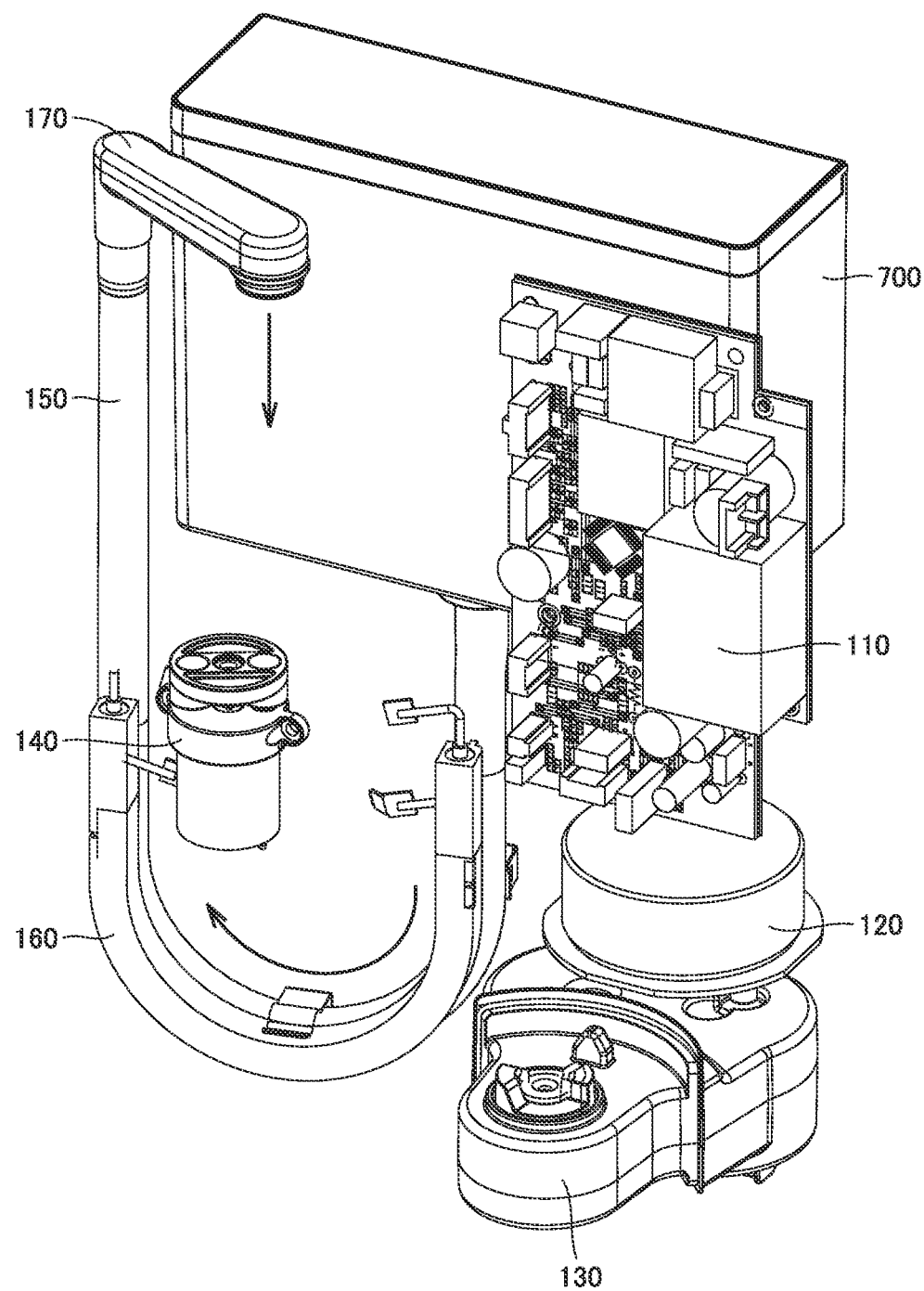
FIG. 44 is a perspective view showing only an internal structure of the beverage preparation apparatus in Embodiment 17.

An internal structure of beverage preparation apparatus 1 will now be described with reference to FIG. 44. FIG. 44 is a perspective view showing only the internal structure of beverage preparation apparatus 1. In apparatus main body 100 of beverage preparation apparatus 1, a control unit 110 including a printed circuit board on which electronic components are mounted is arranged on a front surface side of water tank 700. Based on input of a start signal by a user, the flow for preparation of tea is executed by control unit 110.

A milling motor unit 120 for providing driving force to milling unit 300 is arranged at a position below control unit 110. Milling driving force coupling mechanism 130 provided to protrude forward for transmitting driving force of milling motor unit 120 to milling unit 300 is provided at a position below milling motor unit 120.

To a bottom surface of water tank 700, one end of a hot water supply pipe 150 extending once downward from the bottom surface and then extending upward in a U shape is coupled. Hot water supply nozzle 170 for pouring hot water into agitation tank 510 of agitation unit 500 is coupled to an upper end portion of hot water supply pipe 150. A U-shaped heater 160 for heating water which passes through hot water supply pipe 150 is attached to an intermediate region of hot water supply pipe 150.

(Structure of Milling Unit 300)

Figure 45:
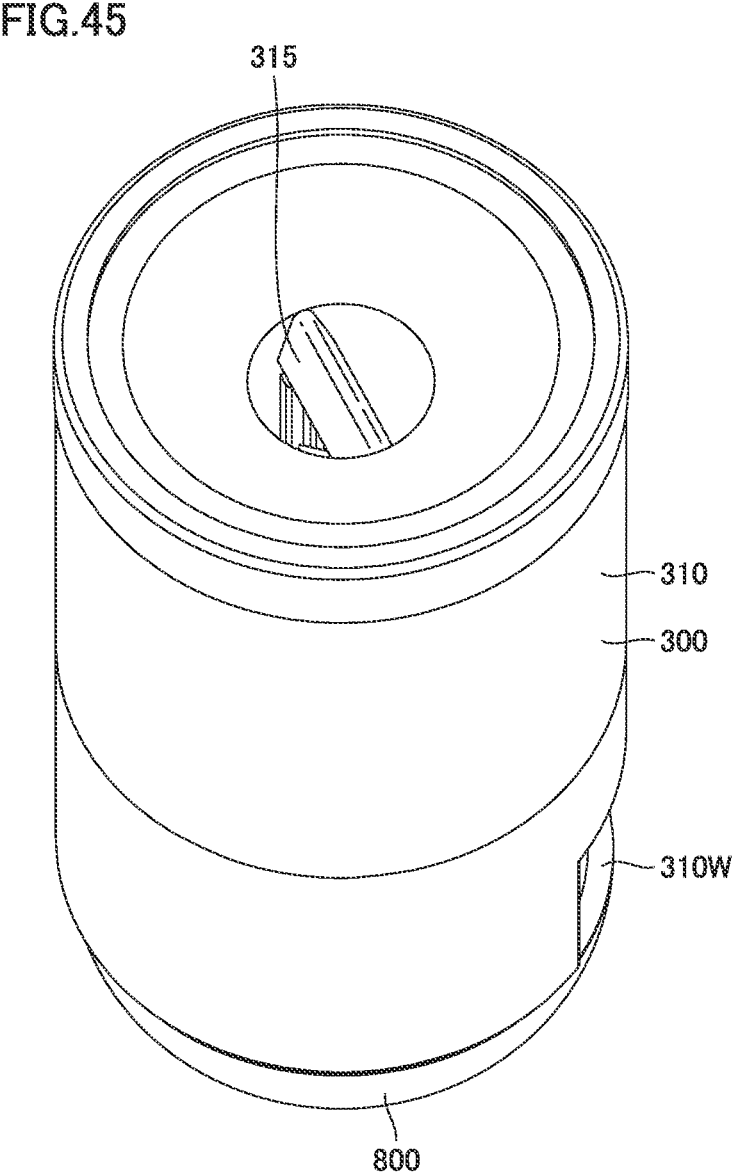
FIG. 45 is a perspective view of a milling unit in Embodiment 17.
Figure 46:
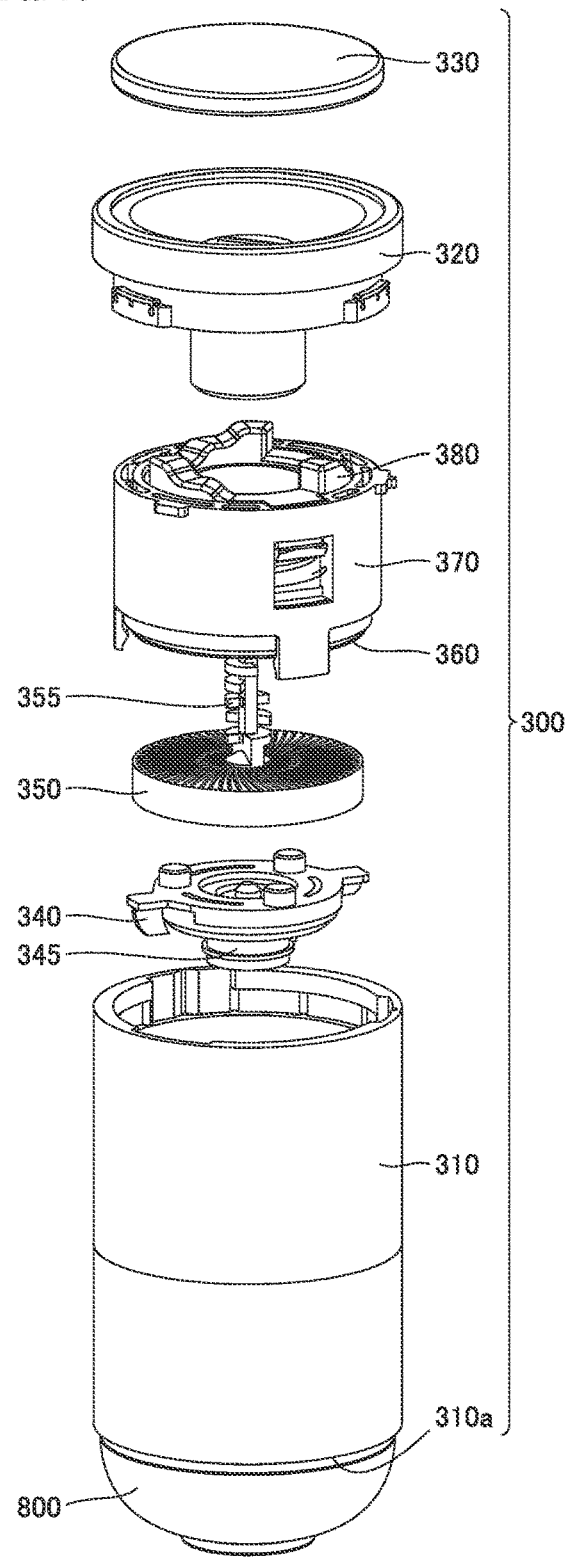
FIG. 46 is an exploded perspective view of the milling unit in Embodiment 17.
Figure 47:
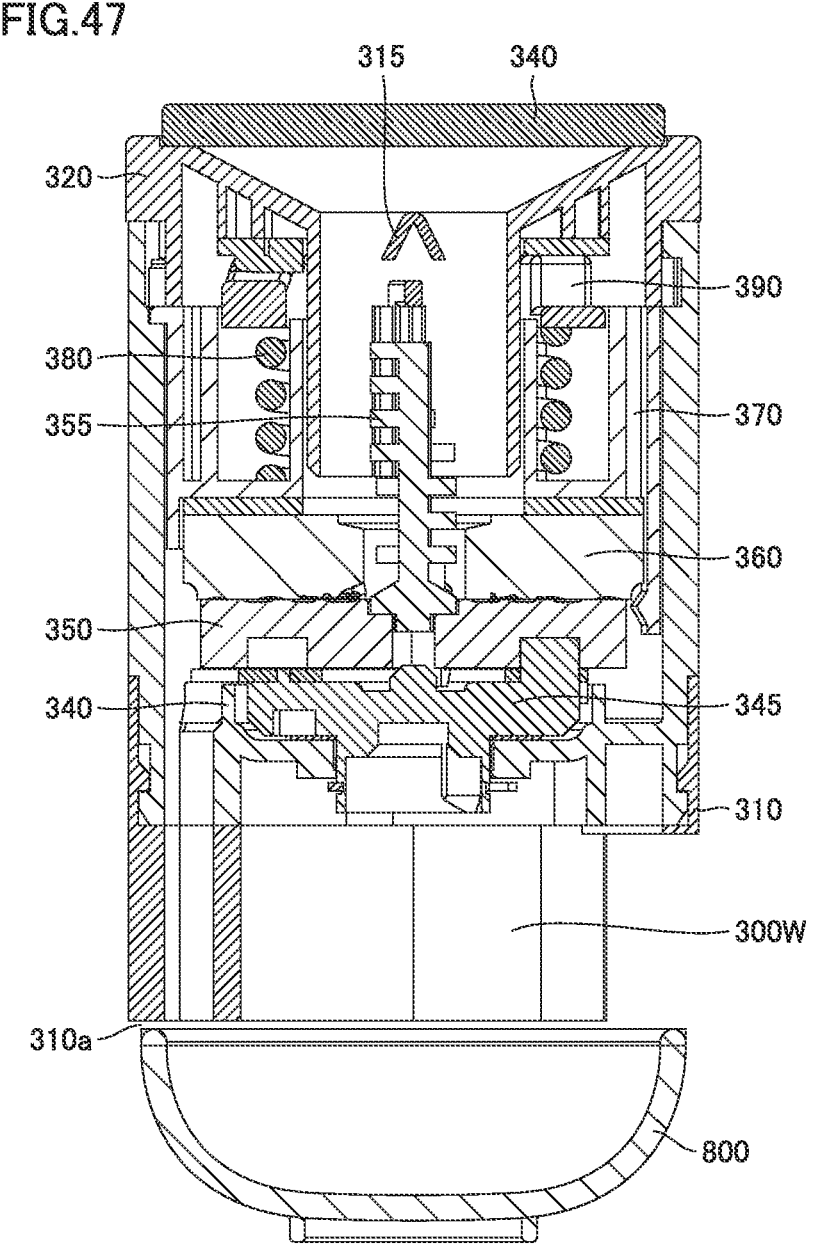
FIG. 47 is a vertical cross-sectional view of the milling unit in Embodiment 17.

A structure of milling unit 300 as a milling apparatus will now be described with reference to FIGS. 45 to 47. FIG. 45 is a perspective view of milling unit 300, FIG. 46 is an exploded perspective view of milling unit 300, and FIG. 47 is a vertical cross-sectional view of milling unit 300.

Milling unit 300 has a milling case 310 having a cylindrical shape as a whole, and a window 310w for coupling in which milling driving force coupling mechanism 130 is inserted is provided in a side surface below. An outlet port 310a is formed at a lowermost end portion of milling case 310 from which powders of tea leaves grated by milling unit 300 are taken out (drop).

A powder scraper 340, a lower mill 350, and an upper mill 360 are sequentially provided from below, in the inside of milling case 310. A milling shaft 345 extending downward is provided on a lower surface of powder scraper 340 and coupled to milling driving force coupling mechanism 130 to thereby rotationally drive lower mill 350.

A core 355 extending upward along a core of the axis of rotation is provided in the central portion of lower mill 350. Upper mill 360 is held by an upper mill holding member 370, and a spring 380 and a spring holding member 390 pressing upper mill 360 downward are accommodated in upper mill holding member 370. Core 355 provided in lower mill 350 protrudes upward to pass through upper mill 360.

(Structure of Agitation Unit 500)

Figure 48:
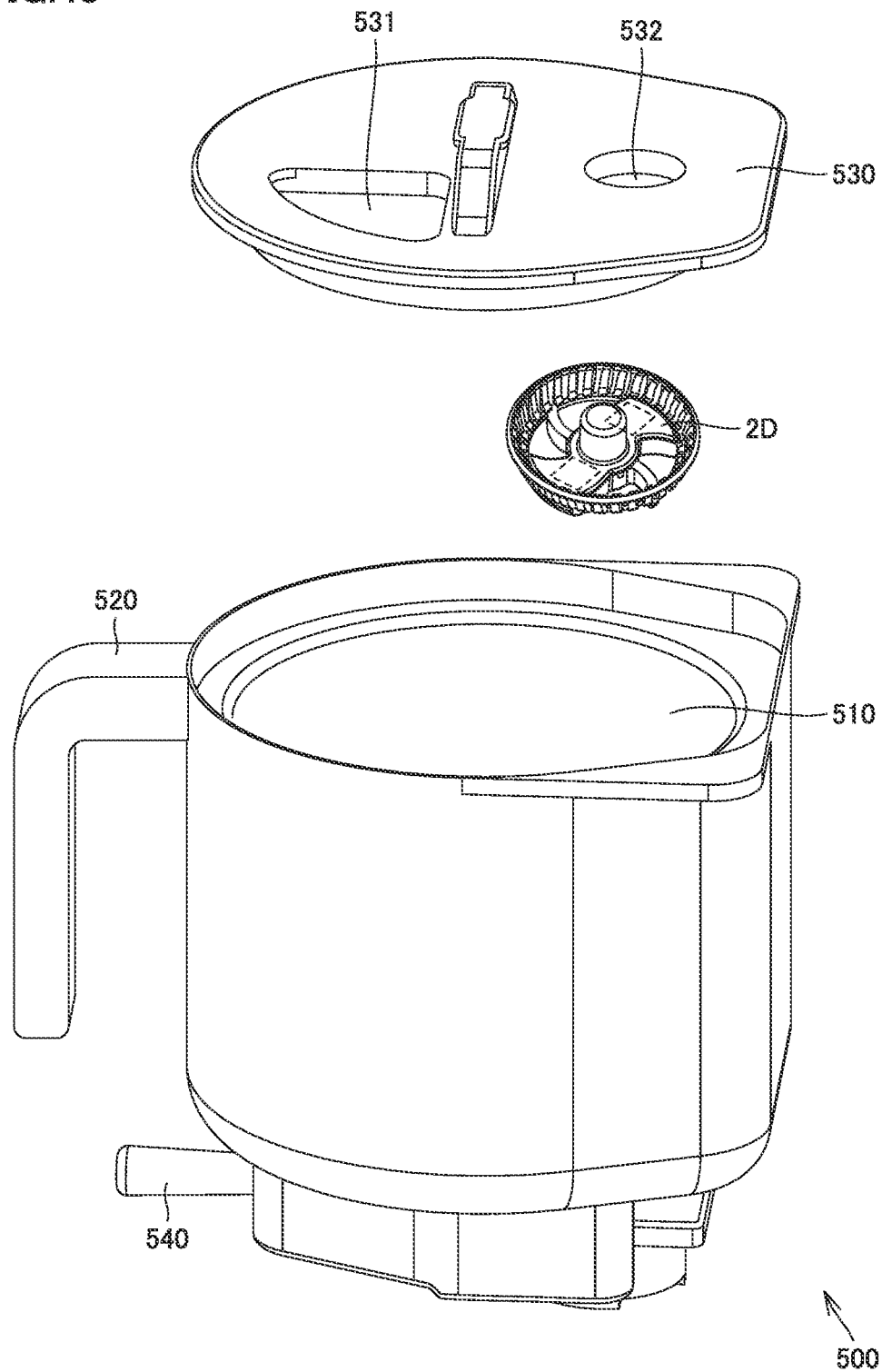
FIG. 48 is a perspective view of an agitation unit in Embodiment 17.
Figure 49:
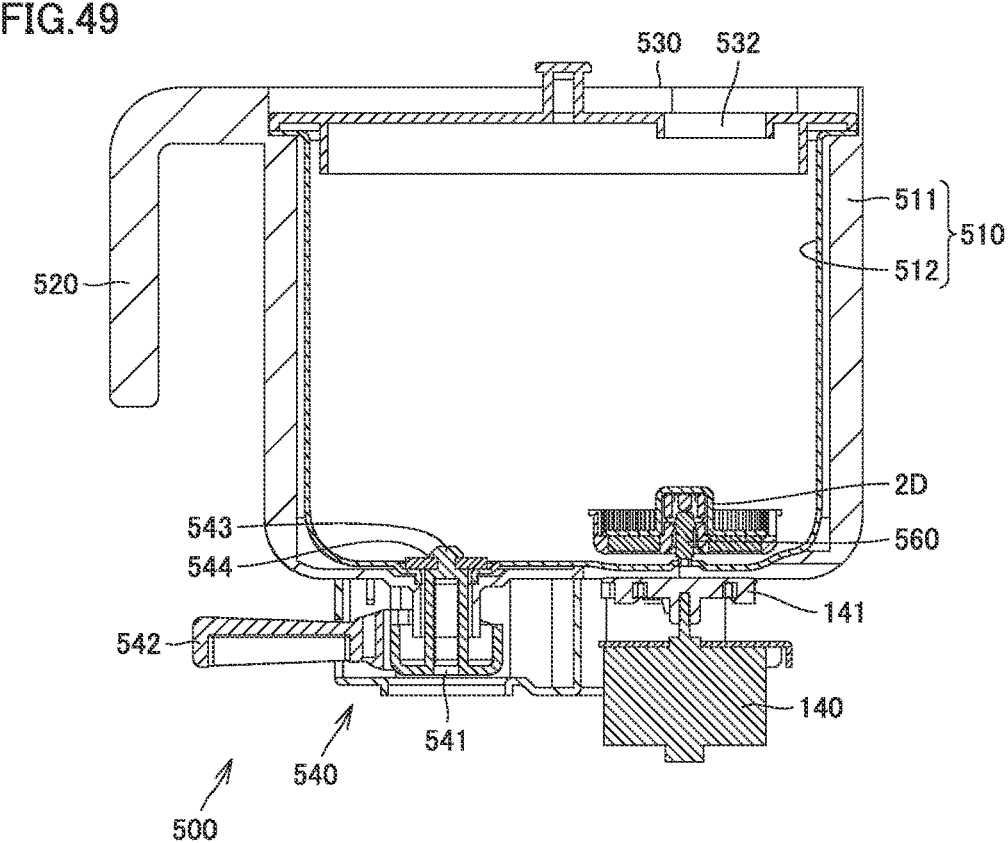
FIG. 49 is a vertical cross-sectional view of the agitation unit in Embodiment 17.
Figure 50:
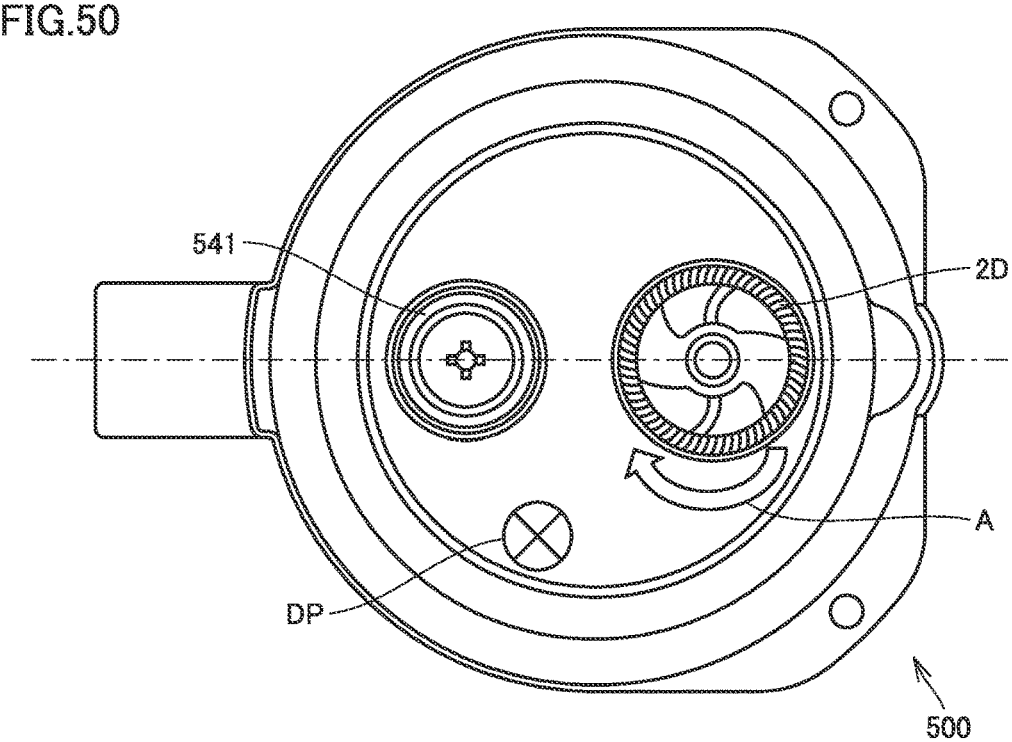
FIG. 50 is a plan view of the agitation unit in Embodiment 17.
Figure 51:
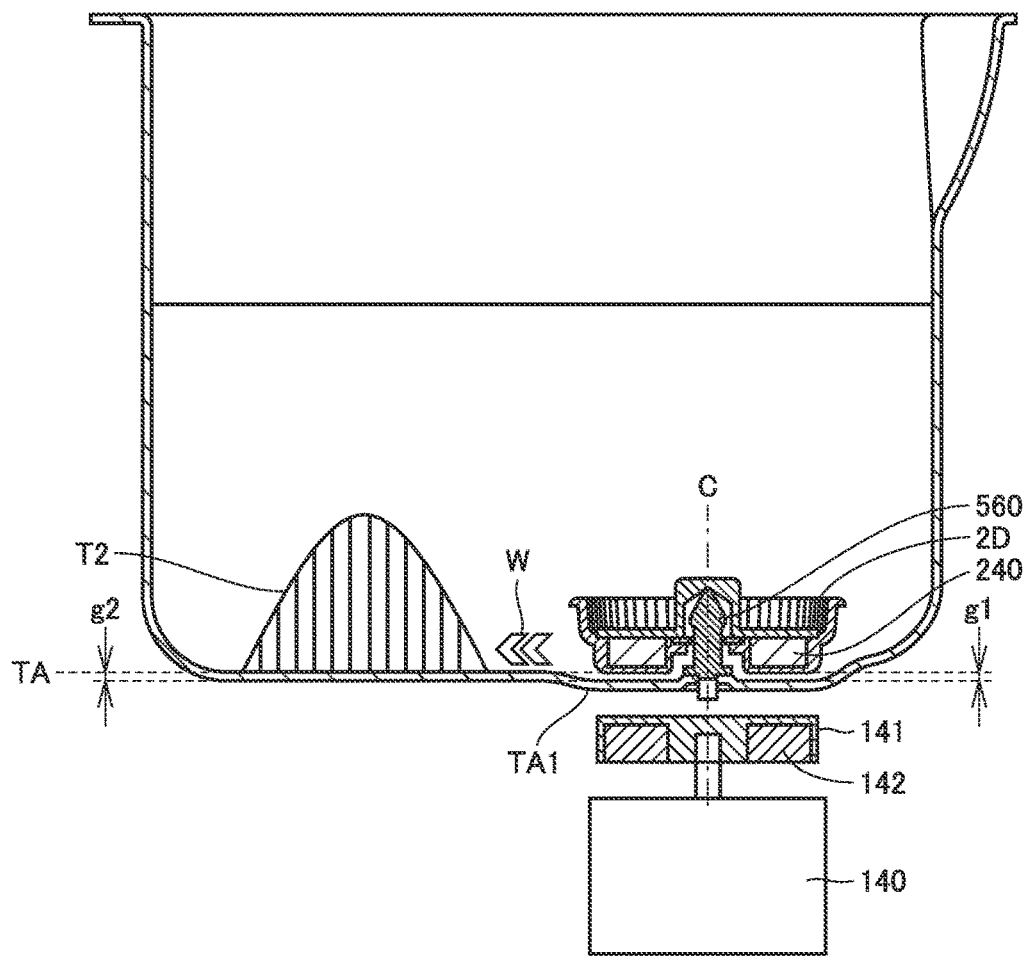
FIG. 51 is a schematic cross-sectional view showing a state of agitation by the agitation unit in Embodiment 17.

A structure of agitation unit 500 will now be described with reference to FIGS. 48 to 51. FIG. 48 is a perspective view of agitation unit 500, FIG. 49 is a vertical cross-sectional view of agitation unit 500, FIG. 50 is a plan view of agitation unit 500, and FIG. 51 is a schematic cross-sectional view showing a state of agitation by the agitation unit.

Agitation unit 500 includes agitation tank 510. Agitation tank 510 includes an exterior holder 511 made of a resin and a thermally insulated tank 512 held by this exterior holder 511. An integrally resin molded grip 520 is provided in exterior holder 511. Over an upper opening of agitation tank 510, an agitation cover 530 opening and closing the opening is provided. Agitation cover 530 is provided with a powder inlet 531 through which tea leaf powders grated by milling unit 300 are introduced and a hot water supply inlet 532 formed in apparatus main body 100, through which hot water is poured from hot water supply nozzle 170.

Agitation blade 2D is placed on a bottom portion of agitation tank 510. A rotation shaft 560 extending upward is provided on the bottom portion of agitation tank 510, and cylindrical core 250 as a bearing portion for agitation blade 2D is inserted in this rotation shaft 560.

Magnet 240 is embedded in agitation blade 2D. In agitation motor contactless table 140A, magnet (magnet on the side of the blade) 240 embedded in agitation blade 550 and a magnet (magnet on a side of the drive mechanism) 142 provided in a turntable 141 on a side of agitation motor unit 140 are magnetically coupled in a contactless state, so that rotational drive force of agitation motor unit 140 is transmitted to agitation blade 550. Magnet 240 and magnet 142 implement the contactless rotational drive mechanism.

In order to enhance holding capability owing to magnetic force during rotational drive, magnet (magnet on the side of the blade) 240 and magnet (magnet on the side of the drive mechanism) 142 are desirably provided at two locations with the center of rotation lying therebetween.

A discharge port 541 for discharging agitated tea is provided in the bottom portion of agitation tank 510. Discharge port opening and closing mechanism 540 is provided at discharge port 541. Discharge port opening and closing mechanism 540 includes an opening and closing nozzle 543 inserted into discharge port 541 so as to be able to open and close discharge port 541 and operation lever 542 controlling a position of opening and closing nozzle 543. Opening and closing nozzle 543 is biased to close discharge port 541 by a biasing member (not shown) such as a spring in a normal state. When a user moves operation lever 542 against biasing force, opening and closing nozzle 543 moves to open discharge port 541 and thus tea in agitation tank 510 is poured into a cup (not shown) placed on placement base 900.

Agitation in agitation tank 510 with agitation blade 2D described above will be described with reference to FIGS. 50 and 51. Referring to FIG. 50, agitation blade 2D is rotatably supported by rotation shaft 560 and rotates in a main direction of rotation A during agitation. Discharge port 541 is provided in agitation tank 510, and the bottom surface of agitation tank 510 is inclined toward discharge port 541. Tea leaf powders representing an object to be agitated are introduced from powder inlet 531 provided in agitation cover 530 onto a point DP where a flow of water during agitation is fast.

Referring to FIG. 51, during agitation, after tea leaf powders T2 are introduced into agitation tank 510, a liquid such as hot water is poured into agitation tank 510. A region directly under agitation blade 2D is provided with a counter bore having a depth g2, in a bottom surface TA of agitation tank 510 on which tea leaf powders T2 land. A region TA1 directly under agitation blade 220 in internal bottom surface TA of agitation tank 510 is recessed below a surrounding region. A clearance g1 is provided between a lower end of agitation blade 2D and the bottom surface of agitation tank 510 directly under the agitation blade, for avoiding rubbing between agitation blade 2D and the bottom surface.

Agitation blade 2D including permanent magnet 240 supported by rotation shaft 560 rotates as a result of action of magnetic force with turntable 141 which holds permanent magnet 142 and is rotated by agitation motor unit 140. Rotating agitation blade 2D forms strong water flow W in particular in the vicinity of paddle surface 212.

In particular, when a grain size of tea leaf powders T2 is fine, a pile of tea leaf powders T2 is stable even in a liquid and less likely to slide because a surface is solidified into a lump like clay. Therefore, for agitation such that the lump does not remain on the bottom surface of agitation tank 510, a strong water flow should impinge in the vicinity of bottom surface TA where a pile of tea leaf powders T2 rests, to thereby cause slide of the pile of tea leaf powders T2.

Since it is necessary to provide clearance g1 directly under agitation blade 2D for avoiding rubbing between agitation blade 2D and bottom surface TA, a counter bore having depth g2 is formed directly under agitation blade 2D. Thus, a height of paddle surface 212 where the strongest water flow is produced is set around the lower end of the pile of tea leaf powders T2.

In order to obtain a higher effect, the lower end of agitation blade 2D is desirably lower than bottom surface TA where tea leaf powders T2 rests, that is, a condition of $g2>g1$ is satisfied. Namely, a lowermost end of agitation blade 220 is located below the bottom surface other than region TA1 directly under agitation blade 220 in internal bottom surface TA of agitation tank 510. Bottom surface TA is defined as a position highest in a surface where tea leaf powders T2 are settled, in consideration of a case that the bottom surface is inclined.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 agitation tank; 1a rotation shaft; 26 rotation shaft; 1b conical projection; 1c conical recess; 1g groove; 1r semi-circular wall; 1y linear wall; 2, 2A, 2B, 2C, 2D, 2E, 2F, 2G, 2H agitation blade; 3 rotational drive mechanism; 4, 5 permanent magnet; 7 position; 8 rectifying wall; 8a fluid inlet portion; 8b fluid exit; 10 rotational drive portion; 11 grating portion; 12 storage portion; 13 supply hole; 14 agitation drive portion; 15, 16 electromagnetic valve; 17 tank; 18 heater; 19 cup; 21 rotation portion; 21 disk-shaped portion; 21a first surface; 21b second surface; 22, 22A, 22B blade portion; 23 slit; 24 auxiliary blade portion; 25 cylindrical core; 25b inclined recessed bottom portion; 25c inclined projecting bottom portion; 25p protrusion; 27 mass balance; 81 curved rectifying wall; 82 linear rectifying wall; 100 apparatus main body; 110 control unit; 120 milling motor unit; 130 milling coupling mechanism; 140 agitation motor unit; 140A agitation motor contactless table; 150 hot water supply pipe; 160 heater; 170 hot water supply nozzle; 180 milling unit attachment region; 190 agitation unit attachment region; 300 milling unit; 310 milling case; 310a outlet port; 310w window for coupling; 313 hopper; 313a opening; 315 safety rib; 315r slope; 320 milling lid; 330 cover for object to be grated; 340 powder scraper; 345 milling shaft; 345p rotational drive pin; 350 lower mill; 350a, 360a grinding surface; 350b grating groove; 350d, 362 hole with bottom; 350c center hole; 350z counter bore; 355 core; 355a spiral blade; 355b nail feature; 355c notch portion; 355d reinforcement rib; 355e retracted outer circumferential surface region; 360 upper mill; 360b grating groove; 360b1 shear groove; 360b2 feed groove; 360c intake groove; 361 opening; 361a inner circumferential surface; 362 hole with bottom; 370 upper mill holding member; 380 spring; 390 spring holding member; 390p rotation stop pin;

500 agitation unit; 510 agitation tank; 520 grip; 530 agitation cover; 531 powder inlet; 532 hot water supply inlet; 540 discharge port opening and closing mechanism; 541 discharge port; 542 operation lever; 543 opening and closing nozzle; 544 tank bottom hole; 550 agitation blade; 551 bearing portion; 560 rotation shaft; 700 water tank; 710 tank main body; 720 tank cover; 800 tea leaf powder tray; 900 placement base; 1000 milling machine; 1500 agitation apparatus; 2000, 2000A beverage preparation apparatus; C central axis of rotation; L centerline; S liquid surface; T1 object to be grated; and T2 powders.

The invention claimed is:

1. An agitation blade for agitating a liquid, comprising:
a rotation portion having a central axis of rotation;
a plurality of blade portions provided on a side of a first surface of the rotation portion; and
a plurality of paddle surfaces provided on a side of a second surface opposite to the first surface of the rotation portion, wherein
the plurality of blade portions surround the central axis of rotation and are in rotation symmetry with respect to a center of rotation of the central axis of rotation,
the plurality of paddle surfaces extend radially from an outer circumferential surface of the central axis of rotation,
the plurality of blade portions and the plurality of paddle surfaces are different in shape from each other,
the plurality of paddle surfaces are lesser in number than the plurality of blade portions, and
the plurality of blade portions and the plurality of paddle surfaces are not superimposed on each other in a vertical direction.

2. The agitation blade according to claim 1, wherein each of the plurality of blade portions has inclination spreading outward with respect to the rotation portion.

3. An agitation apparatus used for agitation of a liquid, comprising:
the agitation blade according to claim 1;
an agitation tank accommodating the agitation blade; and
a drive mechanism for rotating the agitation blade, and
a contactless rotation transmission mechanism transmitting rotational force of the drive mechanism to the agitation blade without contact being provided between the agitation blade and the drive mechanism.

4. The agitation apparatus according to claim 3, wherein the contactless rotation transmission mechanism rotates the agitation blade by generating magnetic coupling between the agitation blade and the drive mechanism and transmitting rotational force on a side of the drive mechanism to a magnet on a side of the blade.

5. An agitation apparatus used for agitation of a liquid, comprising:
the agitation blade according to claim 1;
an agitation tank accommodating the agitation blade; and
a drive mechanism for rotating the agitation blade,
the agitation tank being provided with a rectifying wall provided to surround the agitation blade, for rectifying a flow of the liquid formed as a result of rotation of the agitation blade, together with an inner wall of the agitation tank.

6. A beverage preparation apparatus for preparing beverages with powders, comprising:
a milling machine for obtaining the powders by grating an object to be grated;
a tank for storing a liquid;
a heater portion heating the liquid in the tank and supplying the liquid; and
an agitation apparatus supplied with the powders obtained by the milling machine and the liquid, for mixing the powders and the liquid,
the agitation apparatus according to claim 3, being employed as the agitation apparatus.

7. The beverage preparation apparatus according to claim 6, wherein
the agitation apparatus cools the liquid heated and supplied by the heater portion through rotation of an agitation blade stored inside.

8. The beverage preparation apparatus according to claim 6, wherein
the agitation apparatus has a cooling apparatus and cools the liquid heated and supplied by the heater portion.

9. The agitation blade according to claim 1, wherein
each of the plurality of paddle surfaces includes a first paddle surface and a second paddle surface different in shape from each other, and
any of the first paddle surface and the second paddle surface is provided with a magnet.

10. The agitation apparatus according to claim 3, wherein
a rotation support mechanism supporting a portion of contact of the agitation blade with the agitation tank by point contact during rotation of the agitation blade being provided between the agitation blade and the agitation tank.

* * * * *